(12) United States Patent
Matsuo et al.

(10) Patent No.: US 10,842,076 B2
(45) Date of Patent: Nov. 24, 2020

(54) NUT COLLECTOR

(71) Applicant: INDÚSTRIAS REUNIDAS COLOMBO LTDA, Pindorama (BR)

(72) Inventors: Hugo Matsuo, Catanduva (BR); Oswaldo Argeu Leite, Catanduva (BR)

(73) Assignee: INDÚSTRIAS REUNIDAS COLOMBO LTDA, Pindorama (BR)

( * ) Notice: Subject to any disclaimer, the term of this patent is extended or adjusted under 35 U.S.C. 154(b) by 227 days.

(21) Appl. No.: 16/049,952

(22) Filed: Jul. 31, 2018

(65) Prior Publication Data

US 2019/0183051 A1 Jun. 20, 2019

(30) Foreign Application Priority Data

Dec. 18, 2017 (BR) .......................... 10 2017 027240

(51) Int. Cl.
*A01D 51/00* (2006.01)
(52) U.S. Cl.
CPC ................................. *A01D 51/002* (2013.01)
(58) Field of Classification Search
CPC .................................................... A01D 51/002
USPC .................................. 56/16.6, 328.1; 172/30
See application file for complete search history.

(56) References Cited

U.S. PATENT DOCUMENTS

| | | | | |
|---|---|---|---|---|
| 1,808,928 A * | 6/1931 | Lint | ...................... | A01D 51/002 56/328.1 |
| 2,639,573 A * | 5/1953 | McLaughlin | ........ | A01D 51/002 56/328.1 |
| 4,642,977 A | 2/1987 | Ramacher | | |
| 5,001,893 A | 3/1991 | Stanley et al. | | |
| 5,319,911 A | 6/1994 | Wilhite | | |
| 5,373,688 A | 12/1994 | Stanley et al. | | |
| 5,745,947 A * | 5/1998 | Liu | .......................... | E01H 1/106 15/82 |
| 7,131,254 B2 * | 11/2006 | Flora | .................... | A01D 51/002 56/328.1 |
| 9,027,319 B1 | 5/2015 | Di Anna | | |
| 10,257,980 B1 * | 4/2019 | Savage | ................ | A01D 61/008 |
| 2007/0023328 A1 * | 2/2007 | Flora | ......................... | B07B 7/10 209/143 |
| 2007/0066368 A1 | 3/2007 | Flora et al. | | |

FOREIGN PATENT DOCUMENTS

| | | |
|---|---|---|
| BR | 0201196 | 8/2009 |
| CN | 102948298 | 3/2013 |
| CN | 106717553 | 5/2017 |

* cited by examiner

*Primary Examiner* — Gary S Hartmann
(74) *Attorney, Agent, or Firm* — B. Aaron Schulman, Esq.; Stites & Harbison, PLLC

(57) ABSTRACT

A nut collector which includes a chassis supported on its lower surface over a crosswise shaft and respective wheels, while, on the front side, it receives a coupling drawbar, below which is a collector set is located having rotating brushes and located close to the ground and leveled by side wheels such that aligned fruits in that region are swept inside as the machine moves ahead and subsequently pass through a vibrating screen assembly and selection screens, wherein the residues and debris are separated and the clean nuts pass through a crosswise transporter and elevator for accumulation in a dump bucket.

18 Claims, 43 Drawing Sheets

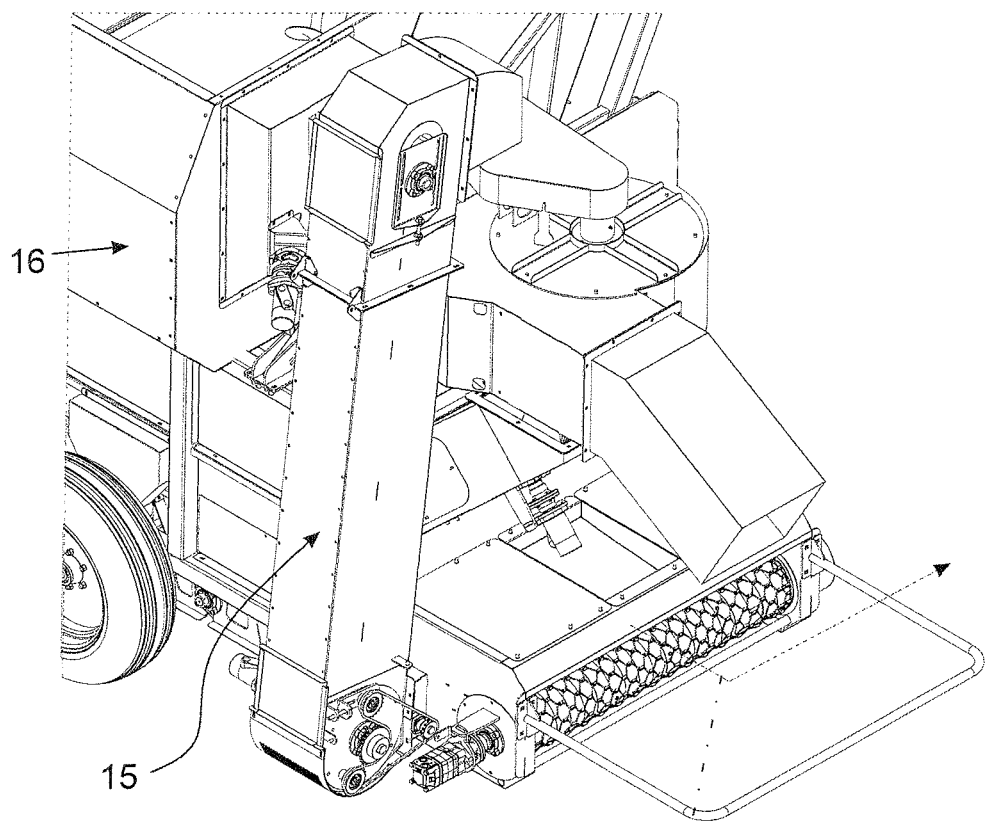
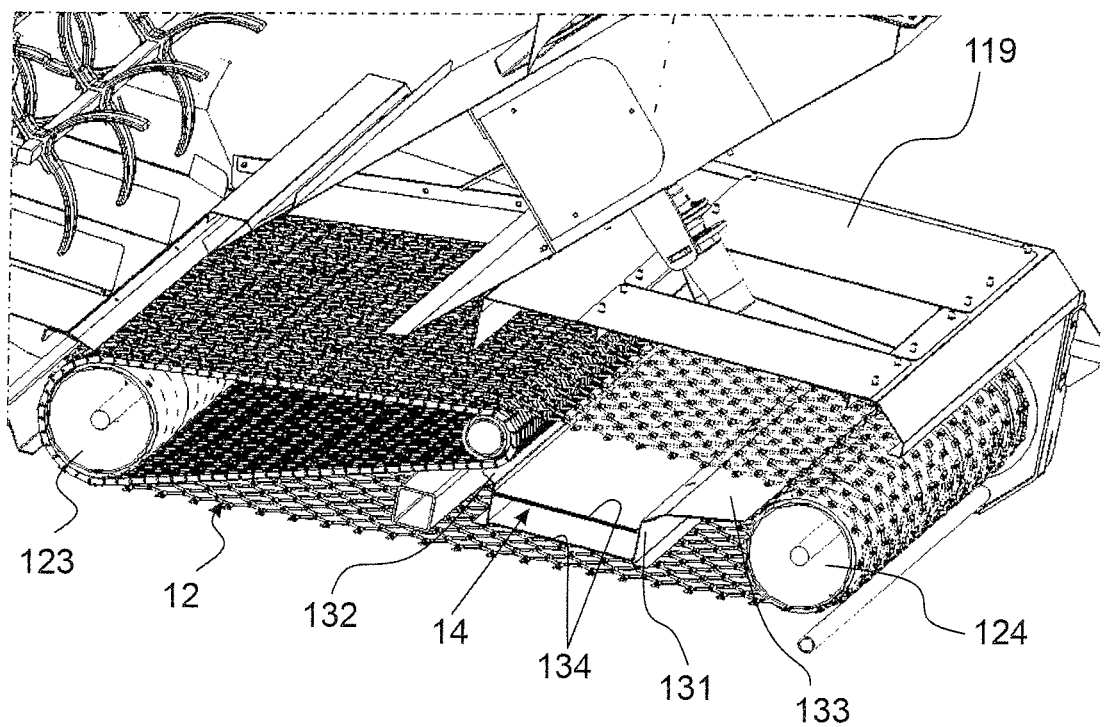
FIG. 29

NUT COLLECTOR

FIELD OF THE INVENTION

The present invention relates to an agricultural machine which is towed and powered by the power outlet of a conventional tractor for the harvesting of agricultural foodstuffs, namely nuts. The machine has means to perform various functions, including: collecting nuts, cleaning steps the collected nuts, guiding cleaned nuts to a dump bucket and providing means for emptying the dump bucket by activating specifically designed hydraulic equipment.

BACKGROUND

As will be appreciated by the skilled person, nuts are generally small fruits from considerably large trees, requiring specific harvesting methods which includes vibration applied to the tree trunk causing ripe fruits to fall directly on and around the surrounding soil and which must subsequently be organized and swept for later collection by specific equipment.

Currently, there is a considerable variety of machines designed to assist with the collection of nuts that have previously fallen on the ground, as taught, for example, by the documents: BR0201196, CN102948298A, CN106717553A, U.S. Pat. Nos. 4,642,977, 5,001,893, 5,319,911, 5,373,688, 7,412,817 and 9,027,319.

There is no doubt that known nut collecting machines can provide good performance for the step of collecting nuts that have fallen on the ground, and moreover some known machines have means to separate nuts from undesired residues and debris and furthermore some machines also offer means for cleaning nuts for accumulation in a dump bucket.

Although these known machines can provide acceptable performance, this could be considerably enhanced as these machines are typically not compact (i.e. they relatively large and long), making them difficult to maneuver between the closely spaced trees in a plantation. Another aspect for improvement is the manner in which collected nuts are stored as the dump buckets that are commonly used often do not provide efficient unloading and are also usually designed in sequential continuity with other parts of the machine thereby considerably increases the overall length of the machine. Another aspect of known machines that could be improved is the fruit selection and cleaning equipment which, in conventional machines, does not utilize a combination of different mesh screens and therefore the fruit selection process requires a very powerful flow of air.

SUMMARY OF THE INVENTION

The first object of the present invention is to provide a combined collective mechanical arrangement for each subset of specific equipment forming the machine. This combined arrangement combines a structure supported on wheels with a front coupling drawbar having means for coupling the present nut collecting machine to a conventional tractor, thereby turning the structure into a small cart. In this structure, each equipment subset has been installed and individually improved and combined with the adjacent cooperating subsets of equipment, resulting in a reduction of space between each of these adjacent, cooperating subsets of equipment, and consequently the present machine is very compact, especially with respect to its overall length, and can be significantly shorter in comparison with conventional prior art machines used for similar purposes.

On the front part of the machine, the nut collecting equipment has two sweeping units which move fruits lengthwise and crosswise, wherein the first sweeping unit is a pair of rotating brushes oriented in opposing and opposite rotational senses, one on each side, thereby sweeping nuts inwardly and crosswise over the soil and directing them to an aligning row, that is oriented parallel to and on the same longitudinal axis as the overall machine and in the machine's general direction of travel. The second sweeping unit is a collecting belt which is oriented lengthwise over the aligned fruits, displacing them lengthwise and rearwardly inside the machine. This whole set of equipment, in addition to including a device adapted to mount and adjust this nut collecting equipment about an angular orientation relative to the ground, is positioned under the coupling drawbar and other parts of the machine, thereby offering a considerable reduction of the overall length of the machine. Moreover, this set of equipment flows into a chassis and over a set of vibrating screens where an air flow cleaning unit and arrangements to prevent material entanglement is provided. This permits cleaned fruits to be delivered to an end gutter that is located crosswise on the lowest part of this set of equipment. This gutter is further operatively linked to a side-mounted cup elevator having an upper edge that dumps clean fruits directly into a dump bucket which is positioned over the chassis and over the set of screening equipment and thereby as a result further reducing the overall length of the machine. Finally, it is contemplated that the dump bucket pivots about an angle for side unloading, which provides yet another advantage as it increases the rate at which the bucket can be unloaded.

BRIEF DESCRIPTION OF DRAWINGS

The present invention will be better understood with reference to the attached drawings, wherein:

FIGS. 28 to 30 also show various views and isometric details from different angles, showing the embodiment details of the crosswise transporter;

DETAILED DESCRIPTION OF THE EMBODIMENTS

Figure 1:
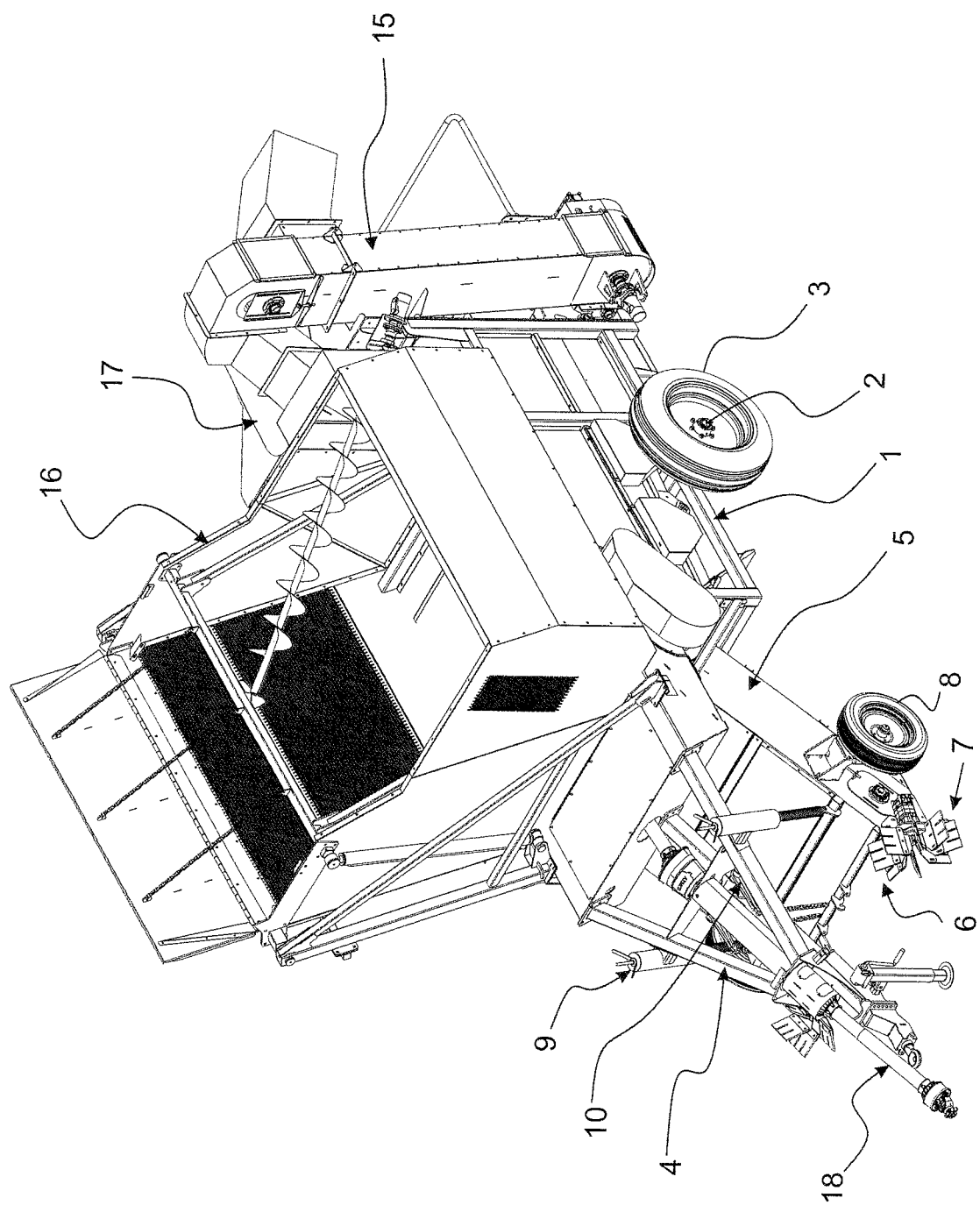
FIG. 1 is an isometric view from an upper front angle of the assembled machine, highlighting its front and left sides.
Figure 2:
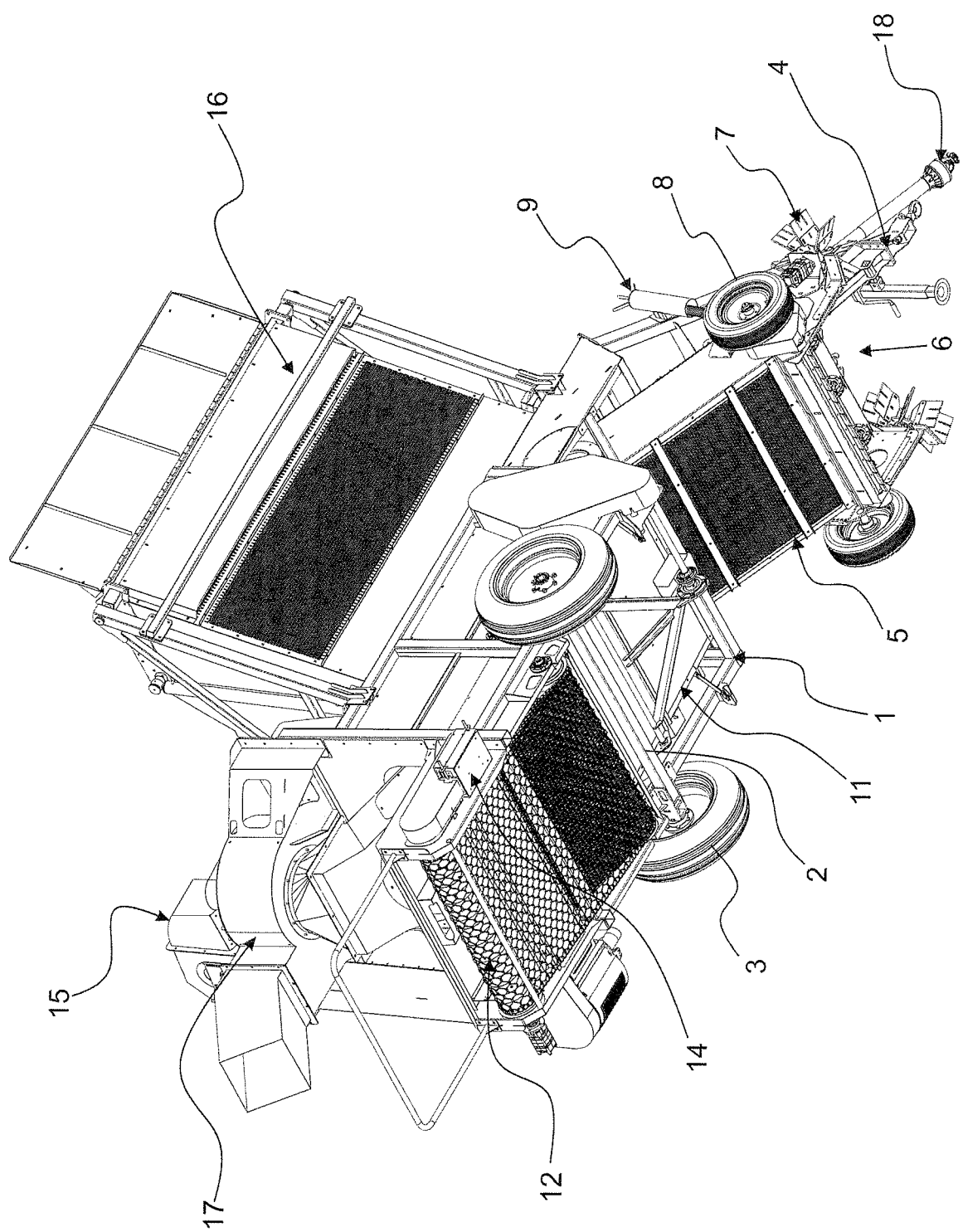
FIG. 2 shows another isometric view of the assembled machine from a lower end angle, highlighting the rear, lower and right sides.
Figure 3:
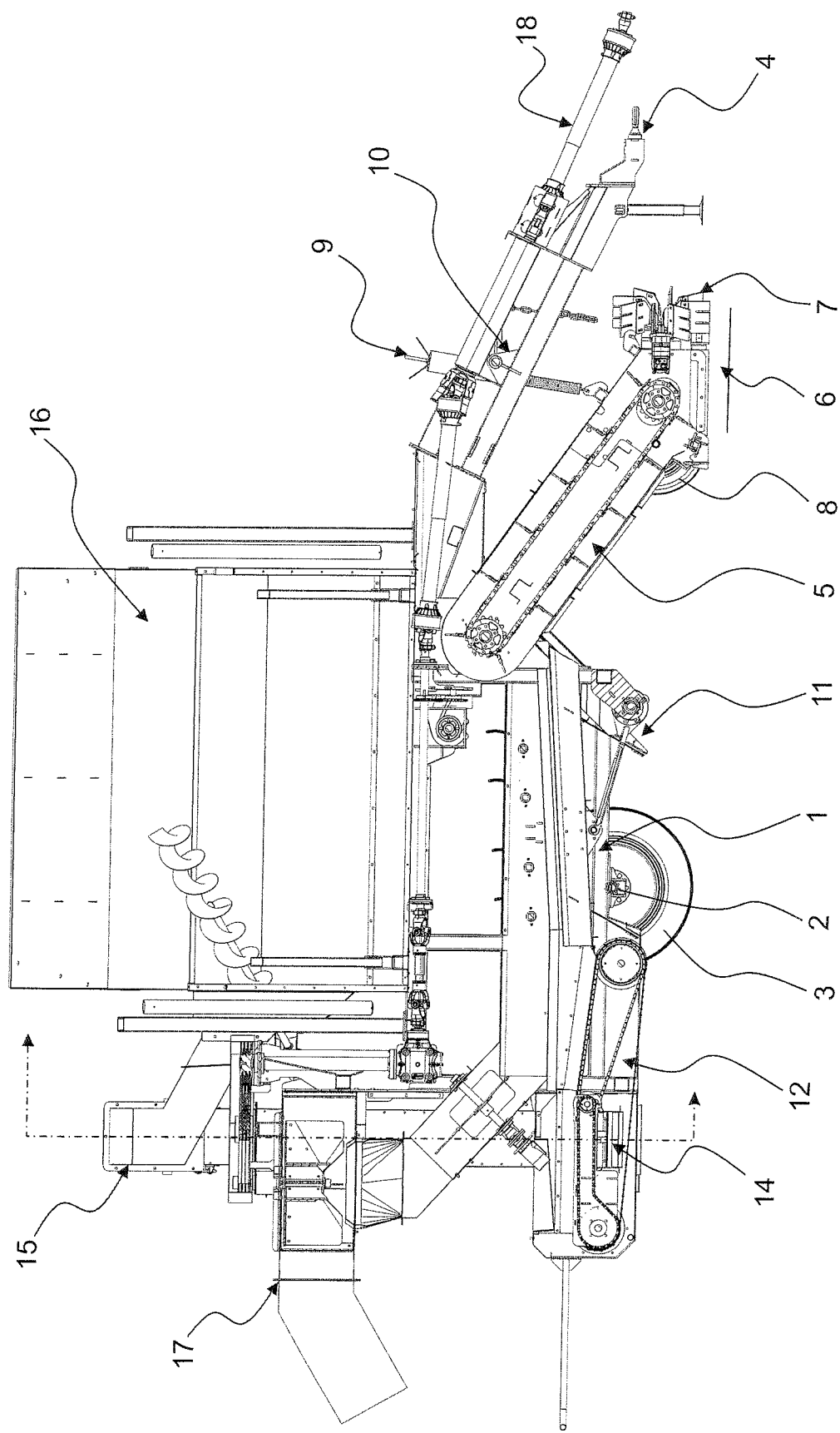
FIG. 3 shows a cutaway lengthwise view, showing internal details of the assembled machine.
Figure 4:
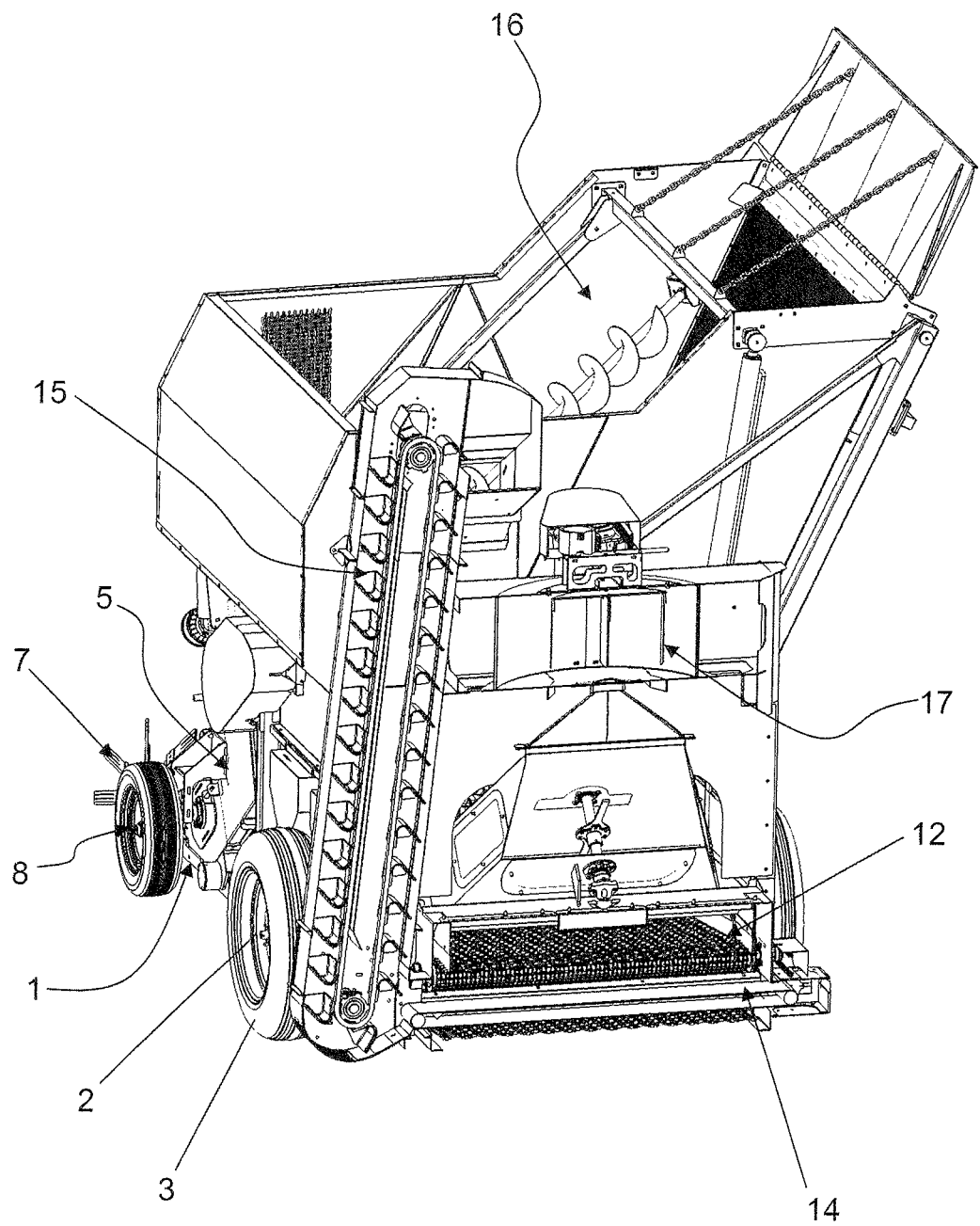
FIG. 4 shows a detailed isometric view of the cutaway illustrated by FIG. 3.

According to these illustrations and their details and more particularly with reference to FIGS. 1 to 4, it is contemplated that the present nut collector can include:

a chassis (1) supported on its lower side over a crosswise shaft (2) and having corresponding wheels (3) and a coupling drawbar (4) on the front side, thereby configuring a cart for the assembly of all equipment subsets to be towed and coupled to a conventional tractor;

a sloped collector set (5), assembled under the coupling drawbar (4), having its rear edge hinged to the upper front part of the chassis (1), while its front edge includes an inlet mouth (6) and is surrounded by rotating brushes (7) located close to the ground and leveled at that point by side wheels (8) so that aligned fruits in that region are swept inside the inlet mouth (6) while the machine moves forward;

springs (9), which are vertically fixed and oriented on each side of the coupling drawbar (4), having their lower ends coupled to the front edge of the collector set (5) in order to alleviate the weight of the collector set during any angled movement over irregular surfaces;

a hydraulic lifter (10), which is fixed under the coupling drawbar (4) on an upper side and on the lower side is adapted for connection to the front edge of the collector set (5) in order to enable the collector set to be lifted into an upper position when the collector set is not in operation;

a vibrating screen assembly (11) located on the lower surface of the structure (1) such that its front end is located under the mouth of the collector set (5), the vibrating screen assembly (11) having a mesh size selected for inhibiting the passage of nuts, but facilitating the passage of smaller residues and unwanted debris, especially earth;

selection screens (12) positioned in continuity with the rear end of the vibrating screen assembly (11), the selection screens (12) extending to the rear of the machine and presenting means for allowing the passage of nuts and retaining larger residues, which are subsequently directly released over the soil at the rear of the machine;

a crosswise transporter (14) assembled to the rear part of the machine and located inside the selection screens (12), wherein clean nuts fall over the crosswise transporter (14);

a side elevator (15) oriented in a nearly vertical manner for transporting clean nuts, having its lower end operatively connected to one of the ends of the crosswise transporter (14) in order to receive clean nuts;

a dump bucket (16), assembled crosswise to the upper surface of the chassis (1), with the upper edge of the elevator (15) also flowing into the bucket;

an aspiration cleaning set (17), assembled crosswise over the initial part of the selection screens (12), which is responsible for collecting the undesired material, such as leaves and other light bits of debris; and a transmission set (18) extending along the coupling drawbar (4) and passing under the dump bucket (16), ending at the aspiration cleaning set (17), along which there are derivations for simultaneously activating various parts of the machine.

Figure 5:
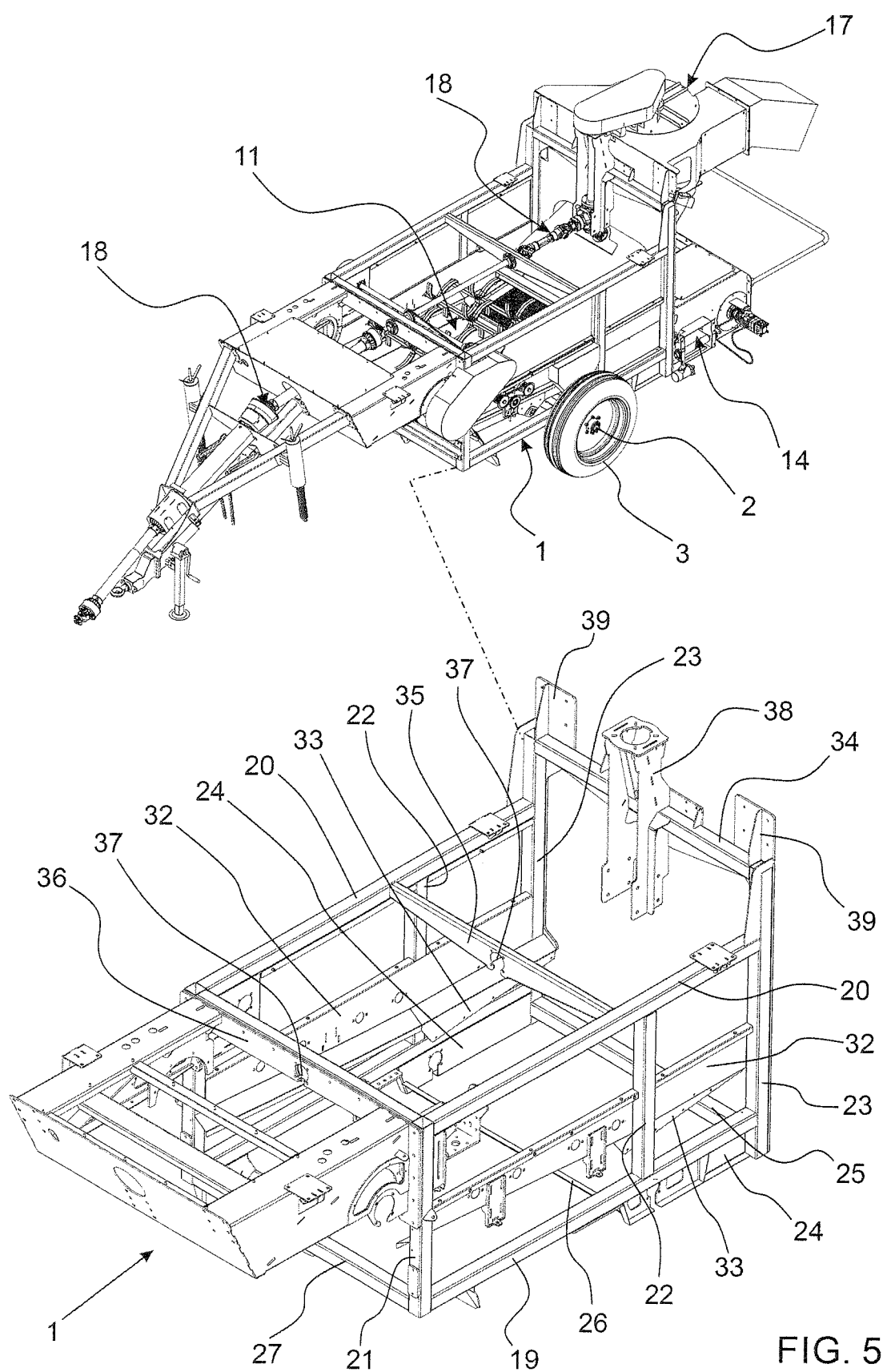
FIG. 5 shows an isometric view of the collector set and an enlarged detail of the chassis from an upper front perspective view.
Figure 6:
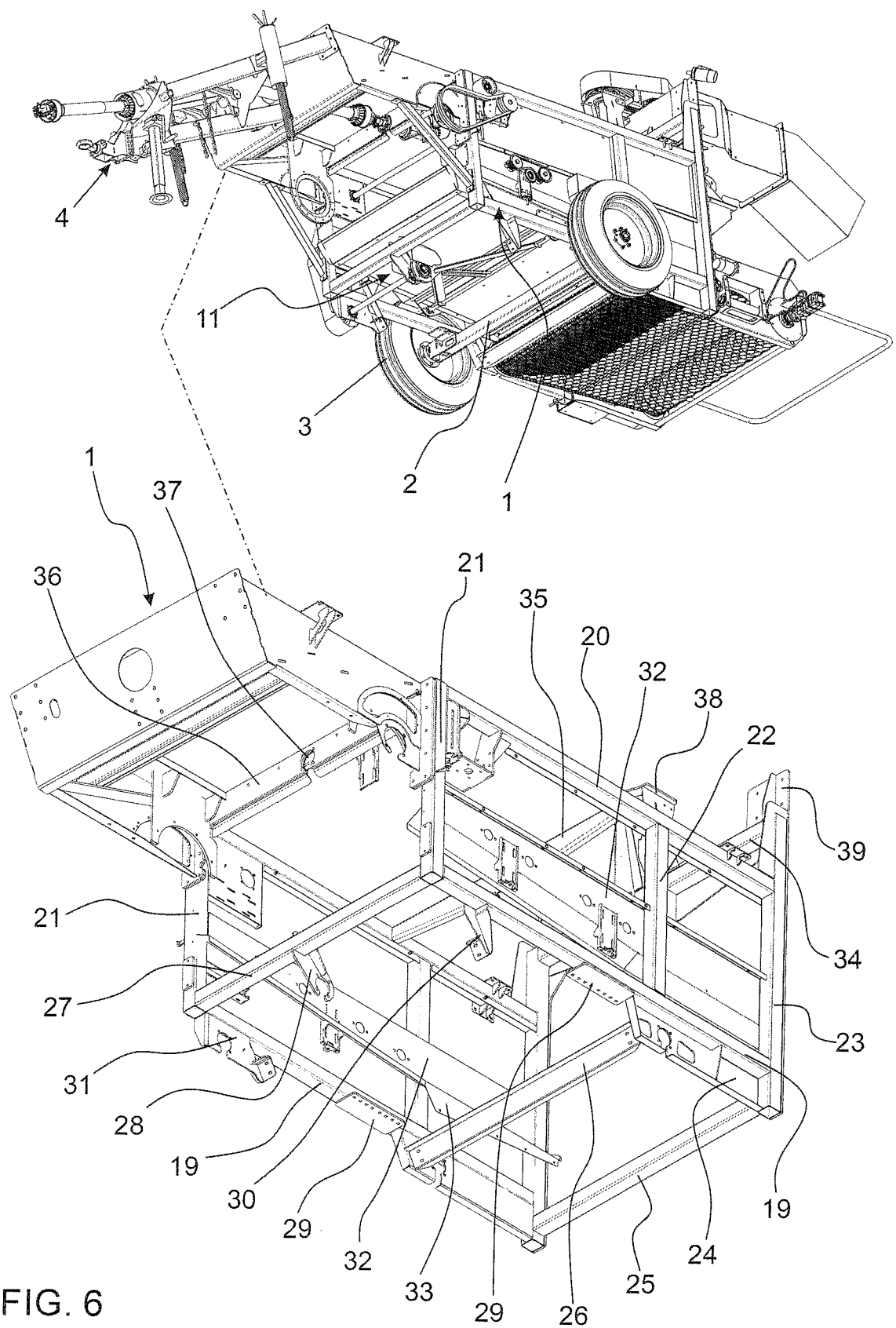
FIG. 6 also shows an isometric view of the collector set and an enlarged front lower perspective view of the chassis with additional details shown.

FIGS. 5 and 6 show the chassis (1) in detail which is formed by a structure of tubes and folded plates that define a first central part in the form of a parallelepiped-shaped case having lower lengthwise rails (19) and upper lengthwise rails (20), interconnected by front uprising beams (21), intermediate uprising beams (22) and rear uprising beams (23), the rear uprising beams (23) being longer in a vertical direction. On the lower part, rear uprising beams (23) are complemented by side plate closures (24) stabilized with rear (25) and intermediate (26) crossbeams, resulting in a lower positioning than the lower surface of the chassis (1) and which is intended for assembly of the crosswise conveyor (14) The lower side of the chassis (1) has a front crossbeam (27) that includes lower intermediate supports (28) and which further interconnects the rails (19). Each rail (19) has a lower face with a lower intermediate support (29), respective side angle supports (30) and (31) and wherein the intermediate supports (29) constitute support points for the axle (2) of the wheels (3), while the supports (28), (30) and (31), jointly with the crossbeam (26), constitute fixing points for at least some parts of the vibrating screen assembly (11).

In an intermediate position, the three uprising beams (21), (22) and (23) are interconnected from the inside by lengthwise plate parts (32) with lower flaps (33) and oriented towards the inner side at an angle thereby constituting a fitting and finishing point for the vibrating screen assembly (11).

It is contemplated that the upper side of the chassis (1) is structurally interconnected by three crossbeams, one of which is an upper rear crossbeam (34), an intermediate crossbeam (35) and a front crossbeam (36). The intermediate crossbeam (35) and front crossbeam (36) have engagements (37) aligned to one another along with a vertically extending support (38) located on the intermediate part of the rear crossbeam (34) such that the crossbeams may support the assembly means for the transmission set (18).

It is further contemplated that additional fixing supports (39) for the cleaning set (17) are provided on the upper corners of the chassis (1).

Figure 7:
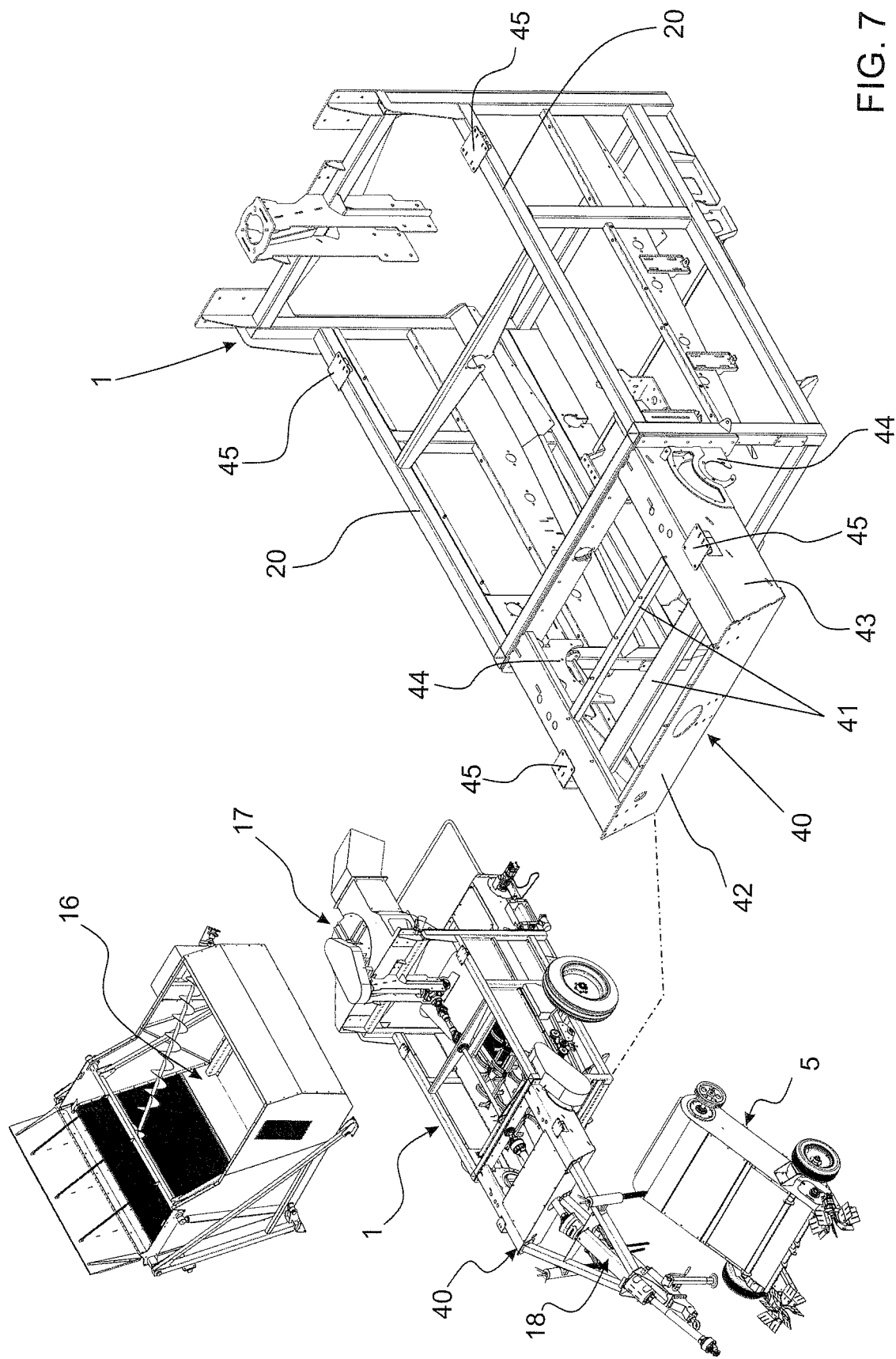
FIG. 7 shows an isometric partially exploded view from an upper front angle of the collector set and an enlarged detail showing only the chassis, also from an upper front perspective, highlighting a structural aspect of the front region of the chassis.
Figure 8:
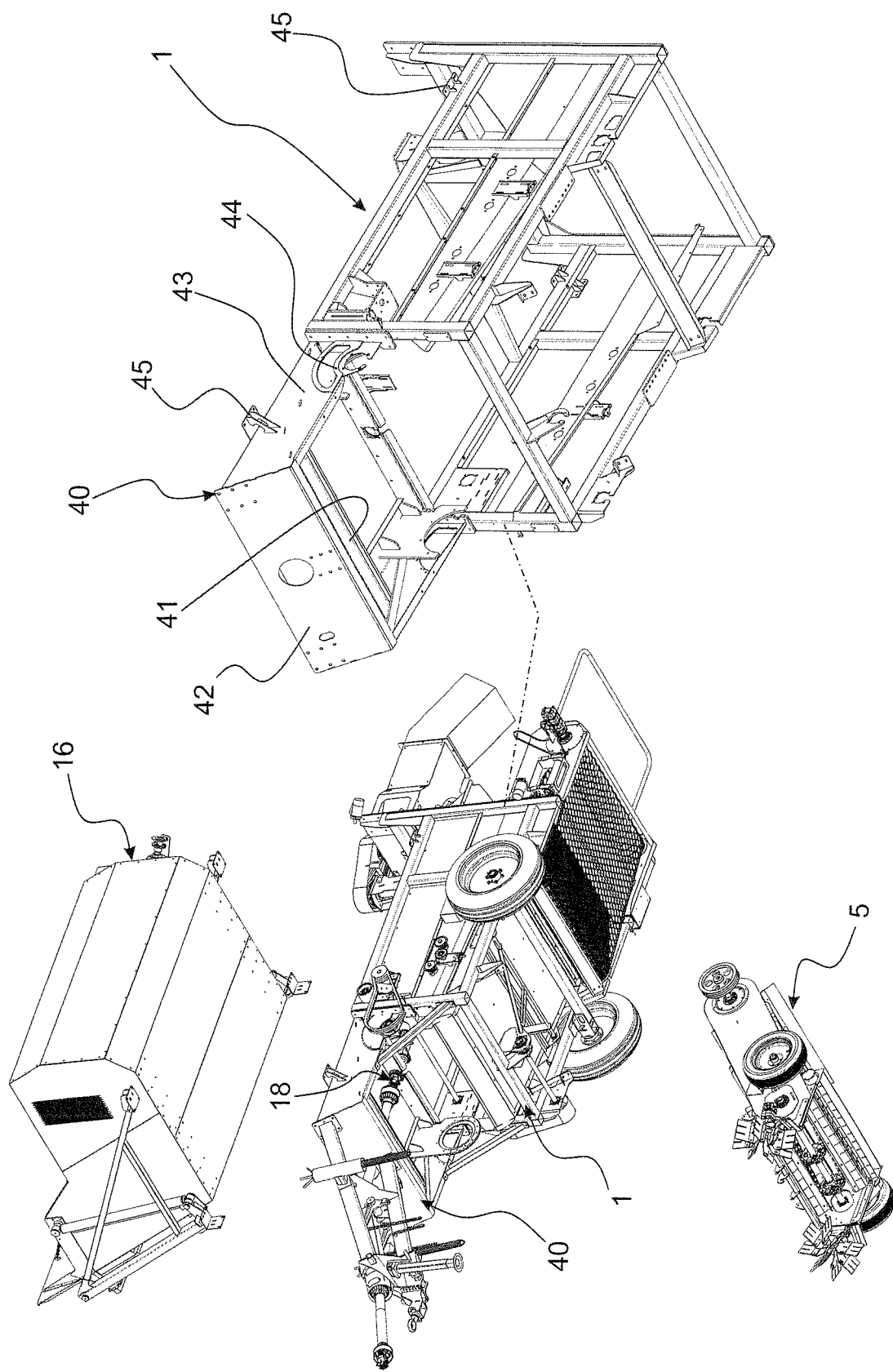
FIG. 8 shows an isometric partially exploded view from a lower front angle of the gutter and an enlarged detail showing only the chassis, also from a lower front perspective, highlighting other details of the structural aspects of the front region of the chassis.

Turning to FIGS. 7 and 8, on the front region of the chassis (1), a structural complement (40) is assembled, in the general form of a case that extends across the entire width of the chassis (1), but extending only across the upper half of its height. The structural complement (40) also has internal crossbeams (41), as well as sloped front (42) and vertical side (43) plate closures, wherein the sloped front plate closure (42) has an opening for receiving the transmission set (18), while the vertical side plate closures (43) have supports (44) constituting a hinged support point for the collector set (5) and wherein the structural complement (40) has supports (45) on an upper side and which are repeated over the rails (20) and collectively constitute points of support for the dump bucket (16).

Figure 9:
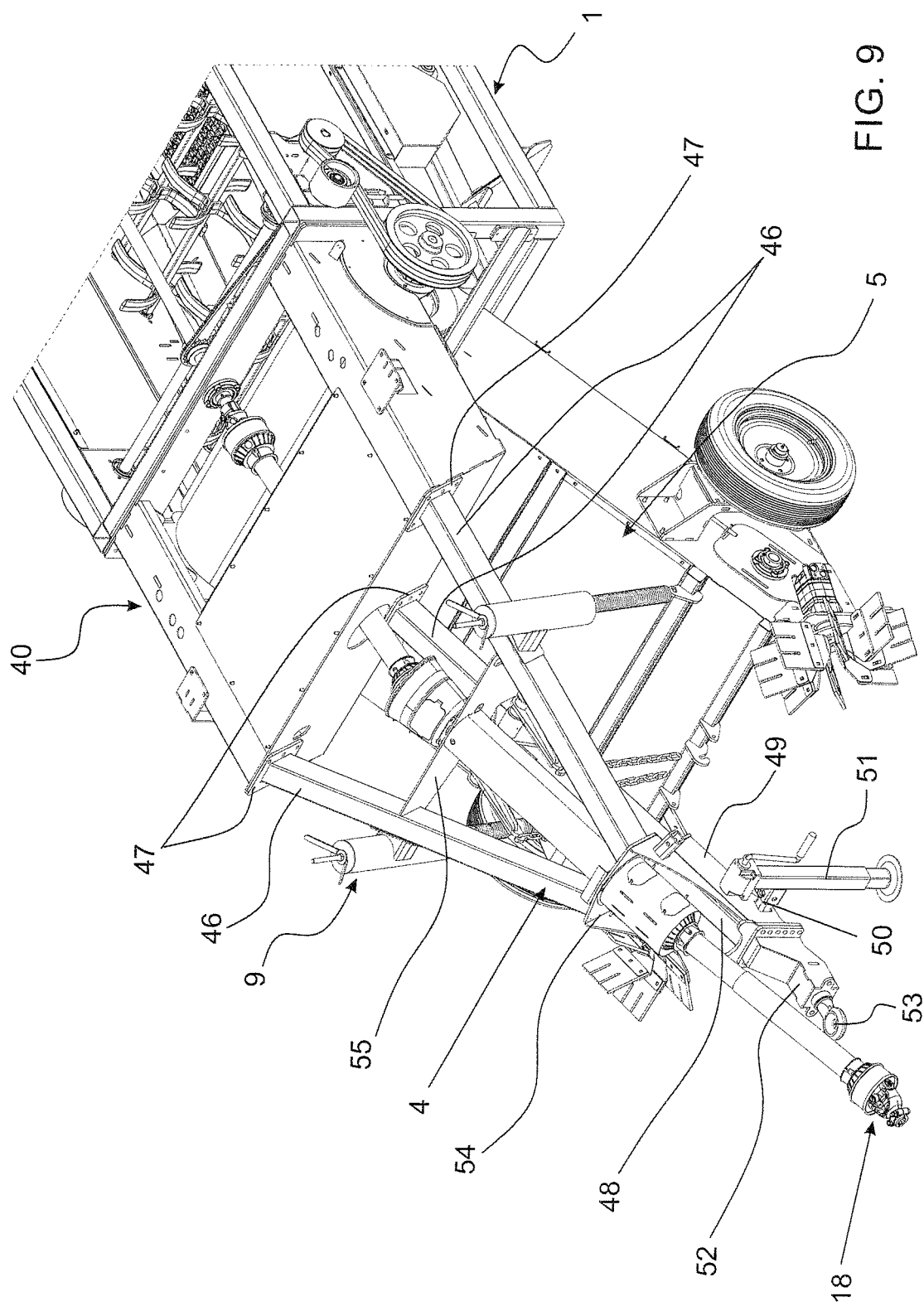
FIG. 9 shows a perspective detail from an upper front angle, showing details of the coupling drawbar used for coupling to the tractor.
Figure 10:
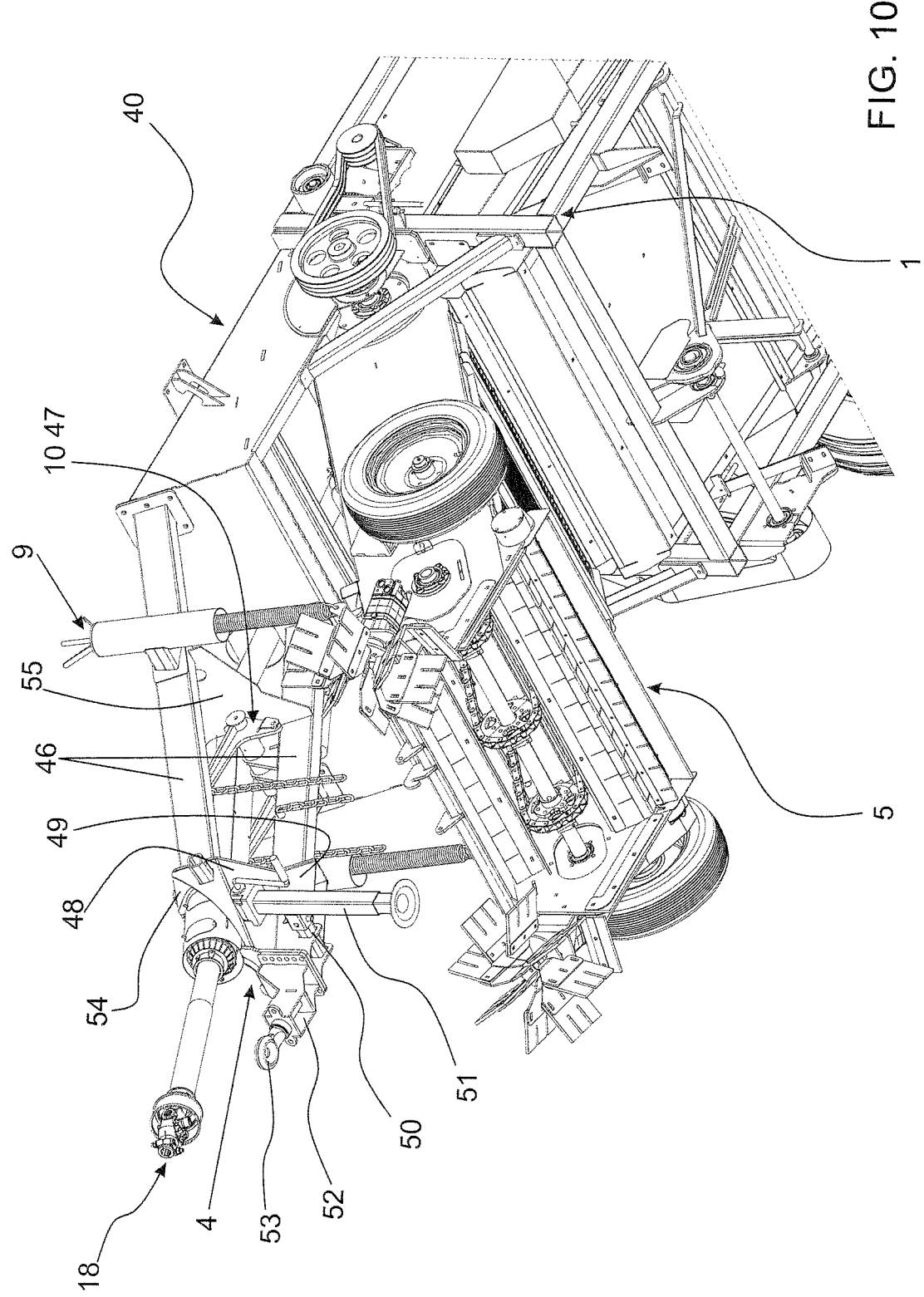
FIG. 10 shows another perspective detail, but from a lower front angle, showing other details of the coupling drawbar used for coupling to the tractor.
Figure 11:
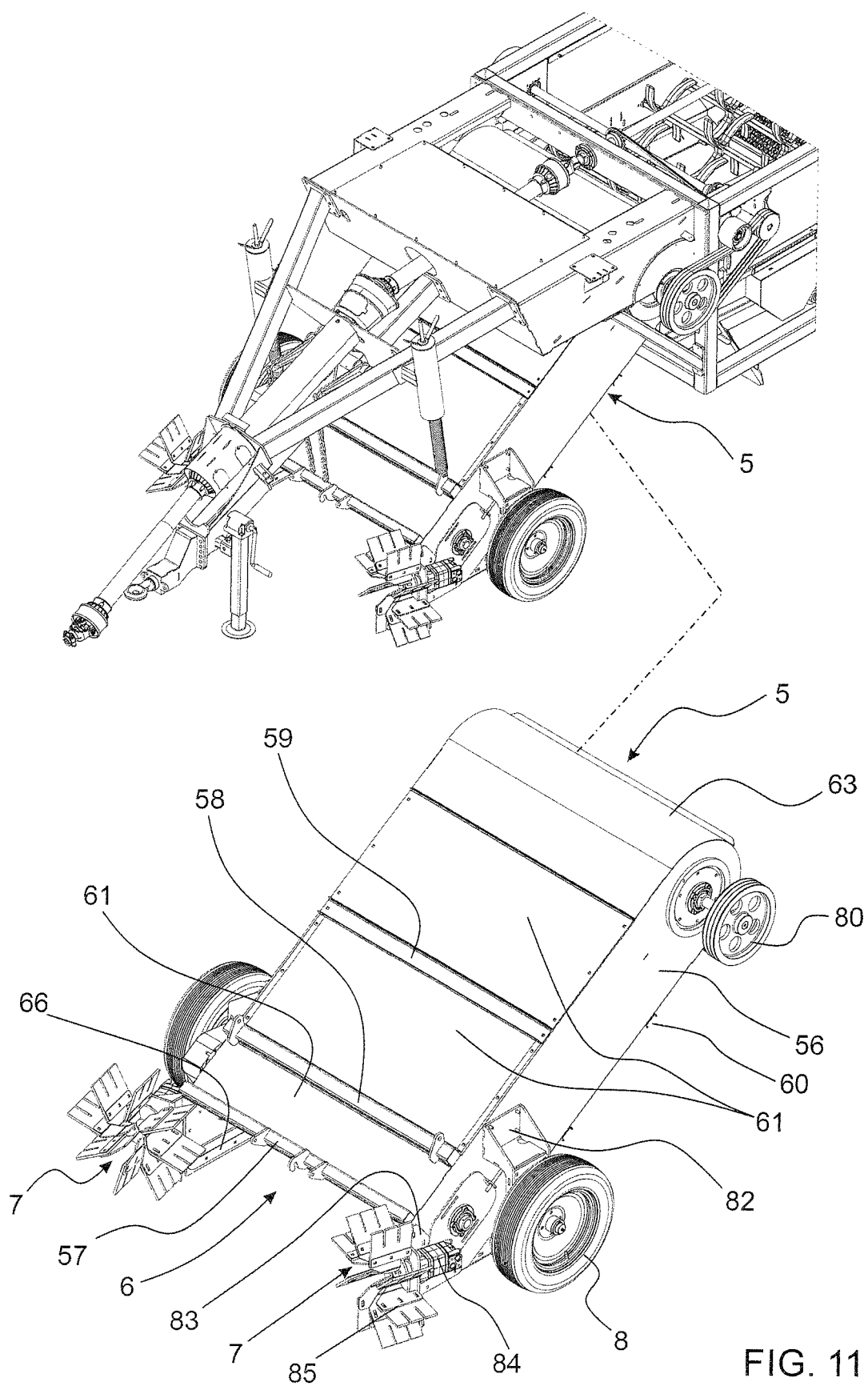
FIG. 11 shows an exploded perspective detailed view, showing the front region of the collector, highlighting the collector set.
Figure 12:
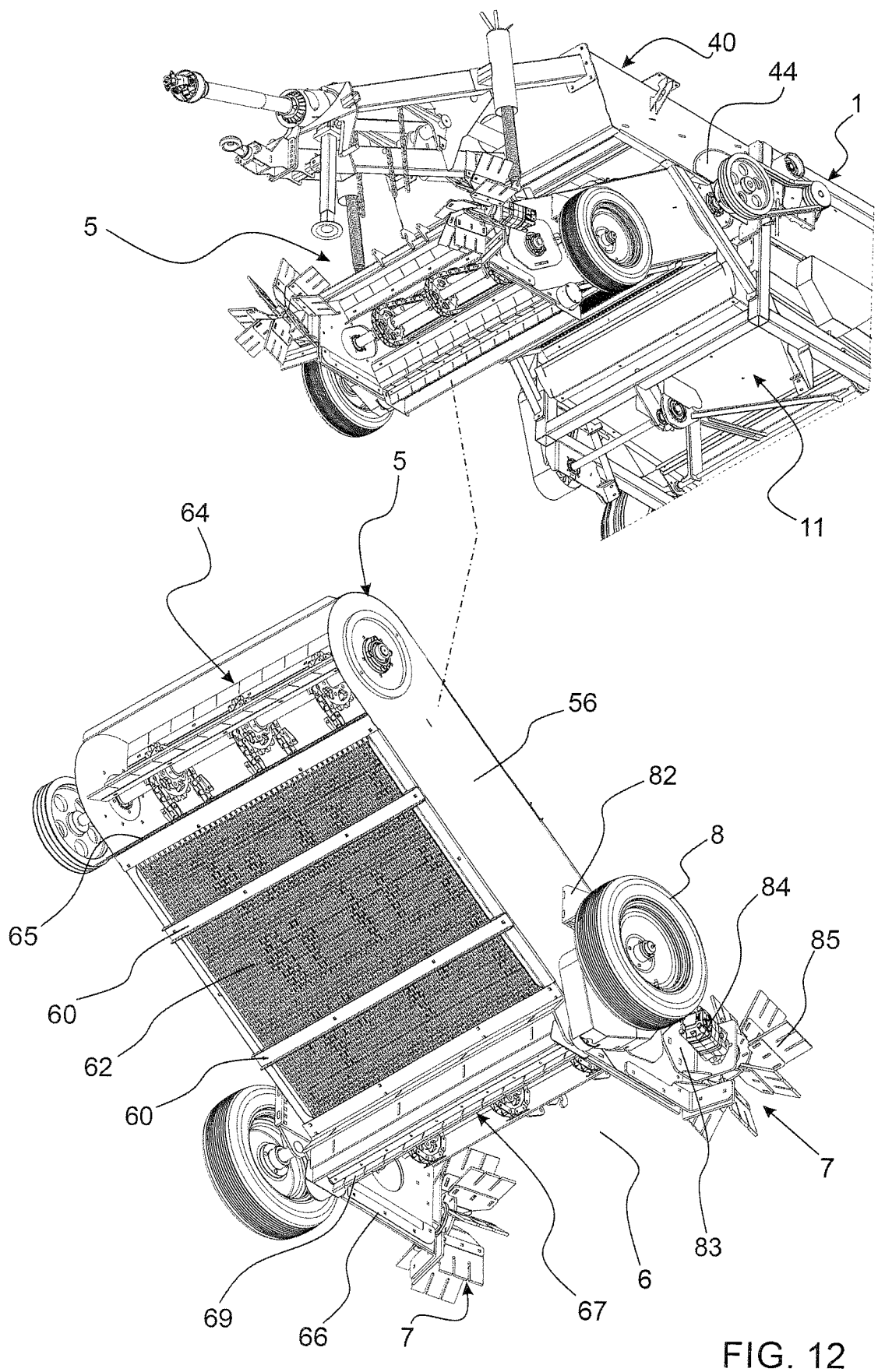
FIG. 12 is the same view as FIG. 11, but from a lower front angle, showing other embodiment details of the collector set.
Figure 13:
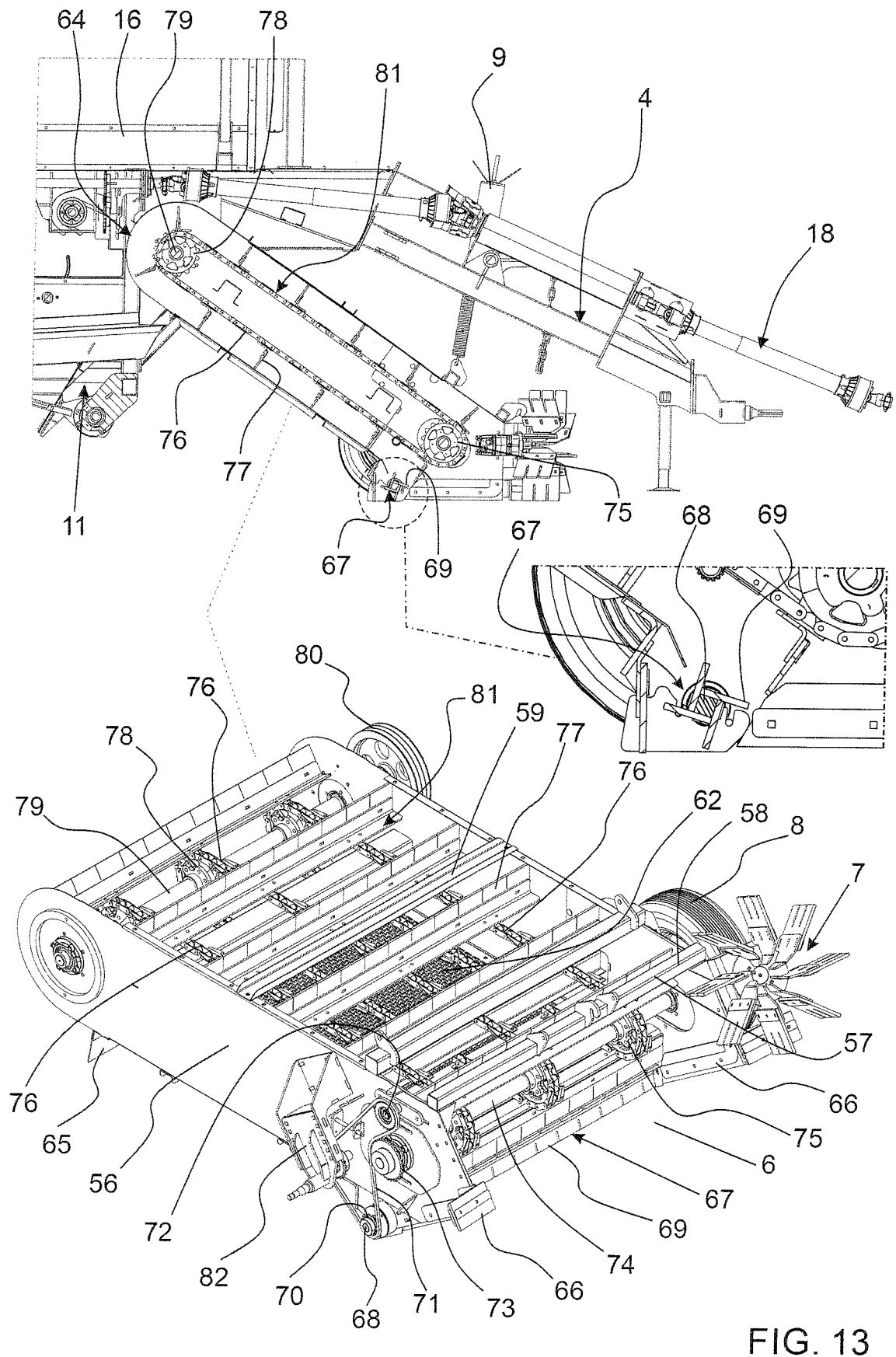
FIG. 13 shows an enlarged cutaway side view of the front region of the machine and an enlarged detail of only the collector set without some of its parts, highlighting a few internal details.
Figure 14:
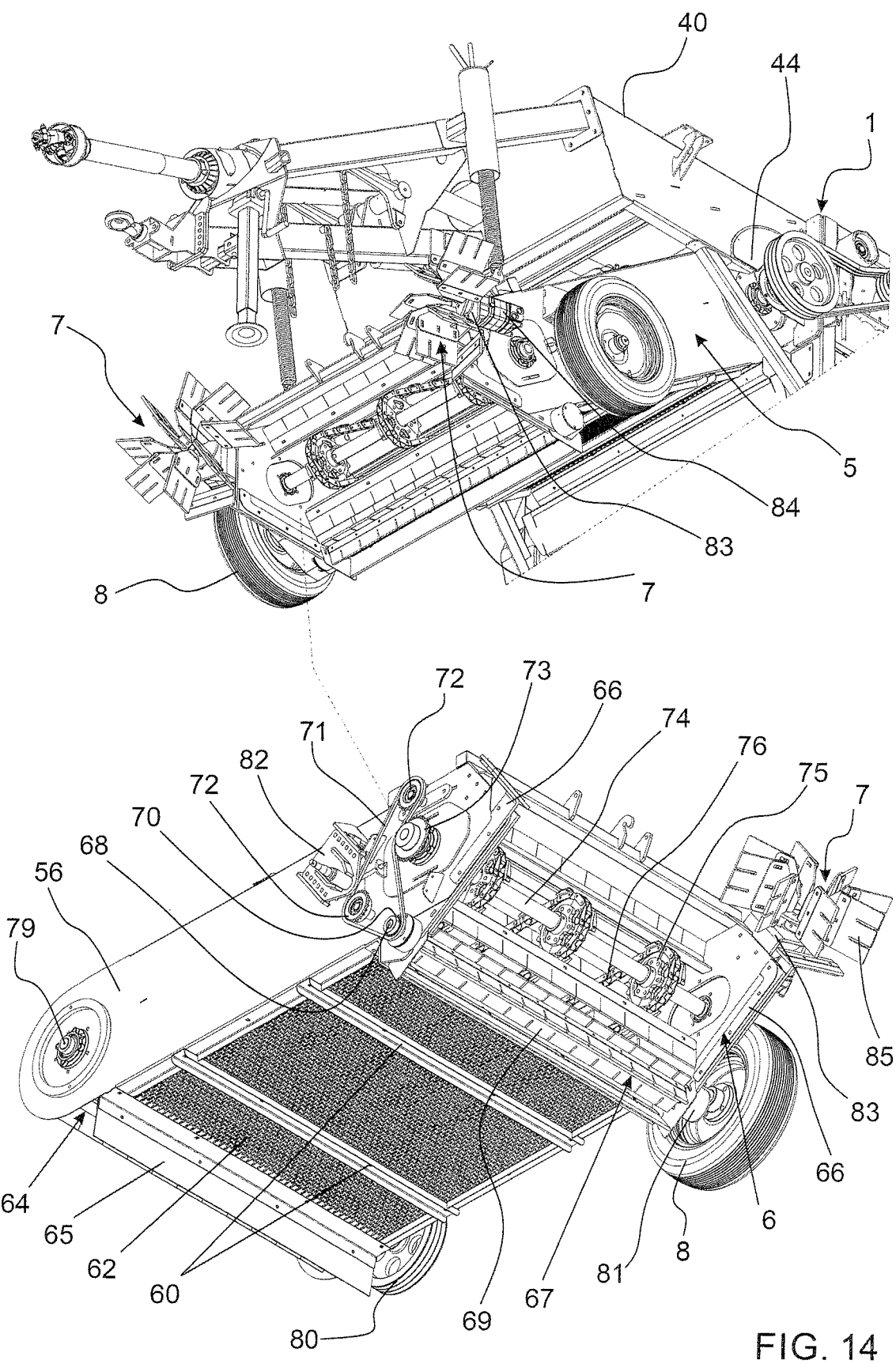
FIG. 14 shows an enlarged perspective lower front view and another lower angle view of the collector set only, showing other details of this embodiment.

FIGS. 9 and 10 show the coupling drawbar (4) in detail which can be formed of three rectangular tubes (46), each tube (46) having rear ends with shoes (47) which are equally fixed against the front side of the structural complement (40). The front ends of each tube (46) converge and are integrated into a plate case (48) thereby forming a pyramid structure with a triangular base. Plate case (48) has a lower complement (49) with support (50) for a conventional jack (51), while the case has an extension (52) that receives a coupling (53) and on the upper part the case is open and completed with a first crosswise plate (54) which, jointly with another intermediate and equally crosswise plate (55), forms intermediate assembly supports for the activation set (18).

FIGS. 11 to 14 show in detail the collector set (5) which is comprised of a tunnel-shaped body having a rectangular cross section, oriented on a slope and being defined by side plates (56) and structurally interconnected by upper crossbeams (57), (58) and (59), lower crossbeams (60), upper plate closures (61) and plate screen (62) located on the lower side of collector set (5).

The upper edges of the side plates (56) are rounded and interconnected by equally rounded closures (63) and further include an outlet (64) with a lower crosswise trim (65) for passing the material to the vibrating screen assembly (11).

The opposed lower edges of the side plates (56) of the collector set (5) are oriented horizontally and are covered by respective angle squeegees (66) such that an angle squeegee (66) is provided for each of the lower edges of the side plates (56) and which work as a funnel to guide the material to be collected to the inlet mouth (6) of the collecting set (5). Further, a crosswise sweeping roller (67) is located on the same working level. Crosswise sweeping roller (67) includes a shaft (68) having radial rubber fins (69) and having its outer ends extending over the side plates (56) and wherein one of its ends receives gearing (70) which, by means of a chain (71) and cooperating chain tensioners (72), is operatively synchronized with another gear (73) provided on shaft (74) and which ends are equally rotatably supported on the front edges of the plate sides (56), between which the shaft (74) distributes a plurality of gears (75) with cooperating chains (76) which are interconnected by various rubber crosswise scrapers (77) and which are further coupled to other equally sized gears (78) of an additional shaft (79) that is supported on and mounted to the lower edges of the side plates (56). Additional shaft (79) receives a traction pulley (80) at one end thereby configuring a scraper belt (81) which pulls the aligned material through the inlet mouth (6) and guides this material to the outlet (64). It is contemplated that in this initial path, pre-cleaning is performed by the screen (62). It will be apparent to the skilled person that the pulley (80) is operably interconnected to the transmission set (18).

It is further contemplated that the upper edge of the collector set (5), as discussed herein, is hinged to the chassis (1) by way of shaft (79) which has ends are that are rotatably supported and mounted on supports (44) provided on the structural complement (40) of the chassis (1).

Supports (82) for the side wheels (8) are located on the external faces of the lower edges of the side plates (56), thereby maintaining the lower edge of the collector set (5) level with the ground and, consequently, also keeping the sweeping roller (67) and the rotating brushes (7) equally leveled with the ground.

It is contemplated that each rotating brush (7) comprises an L-shaped support (83) having a corresponding hydraulic motor (84), each hydraulic motor (84) having a forwardly projecting shaft and receiving a rubber brush (85), wherein the rotating brush (7) is also sloped at an inward angle with sufficient slope to enable the rotating brushes on both sides to throw the fruits from the ground into the inlet mouth (6).

Figure 15:
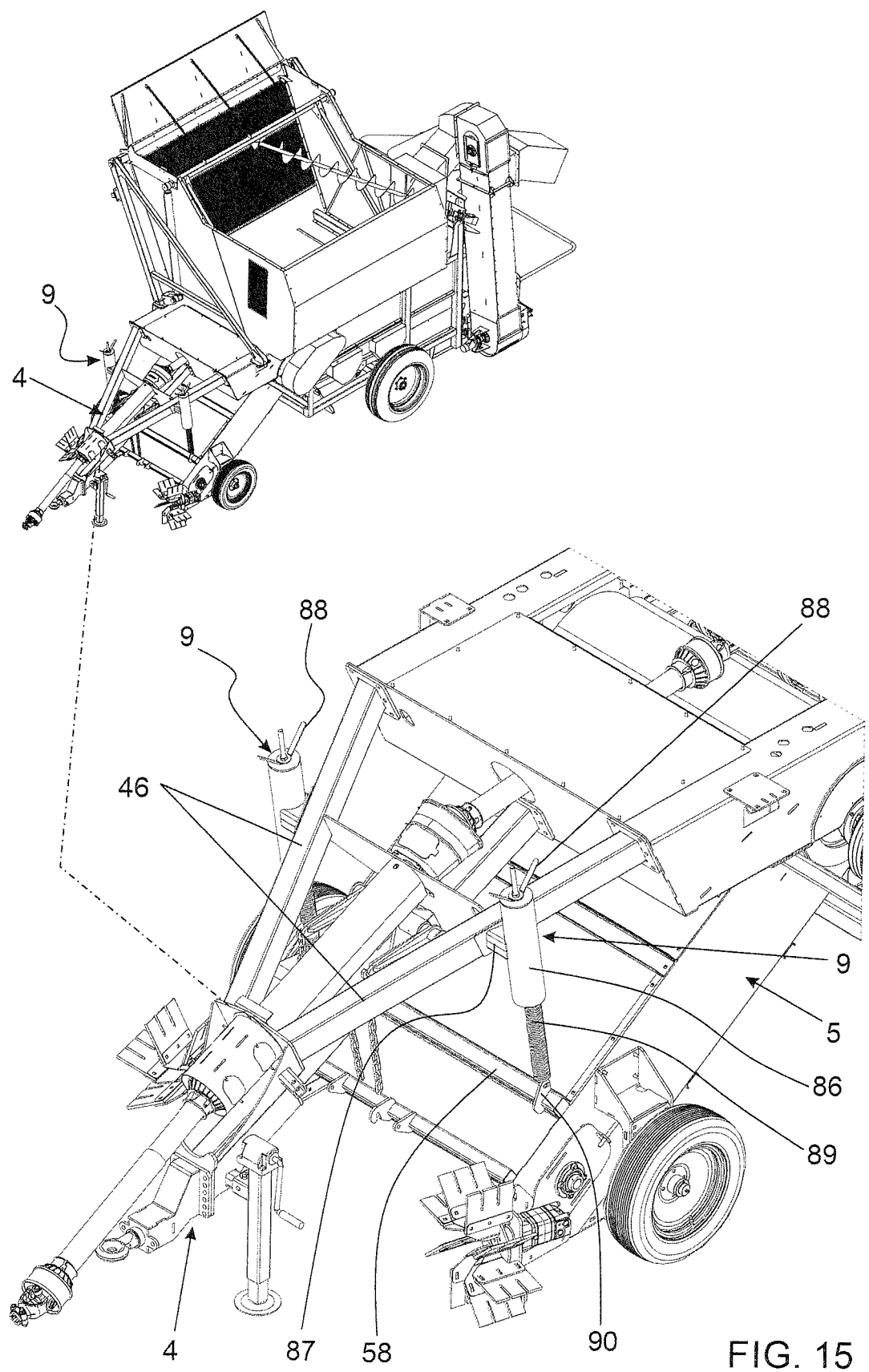
FIG. 15 is an isometric view from a front angle and in an enlarged detail, highlighting the embodiment details of the sustaining springs for the collector set.

As shown in FIG. 15, each spring (9) is formed by a vertical tube (86) which is fixed to the respective tube (46) of the coupling drawbar (4) by means of support (87). Tube (46) has a manually adjustable fuse (88) pulling a spring (89). Spring (89) is equally housed inside tube (46) and has its lower end coupled into a hook (90) welded to the crossbeam (58) of the collector set (5) thereby allowing the weight of collector set (5) to be alleviated by springs (9).

Figure 16:
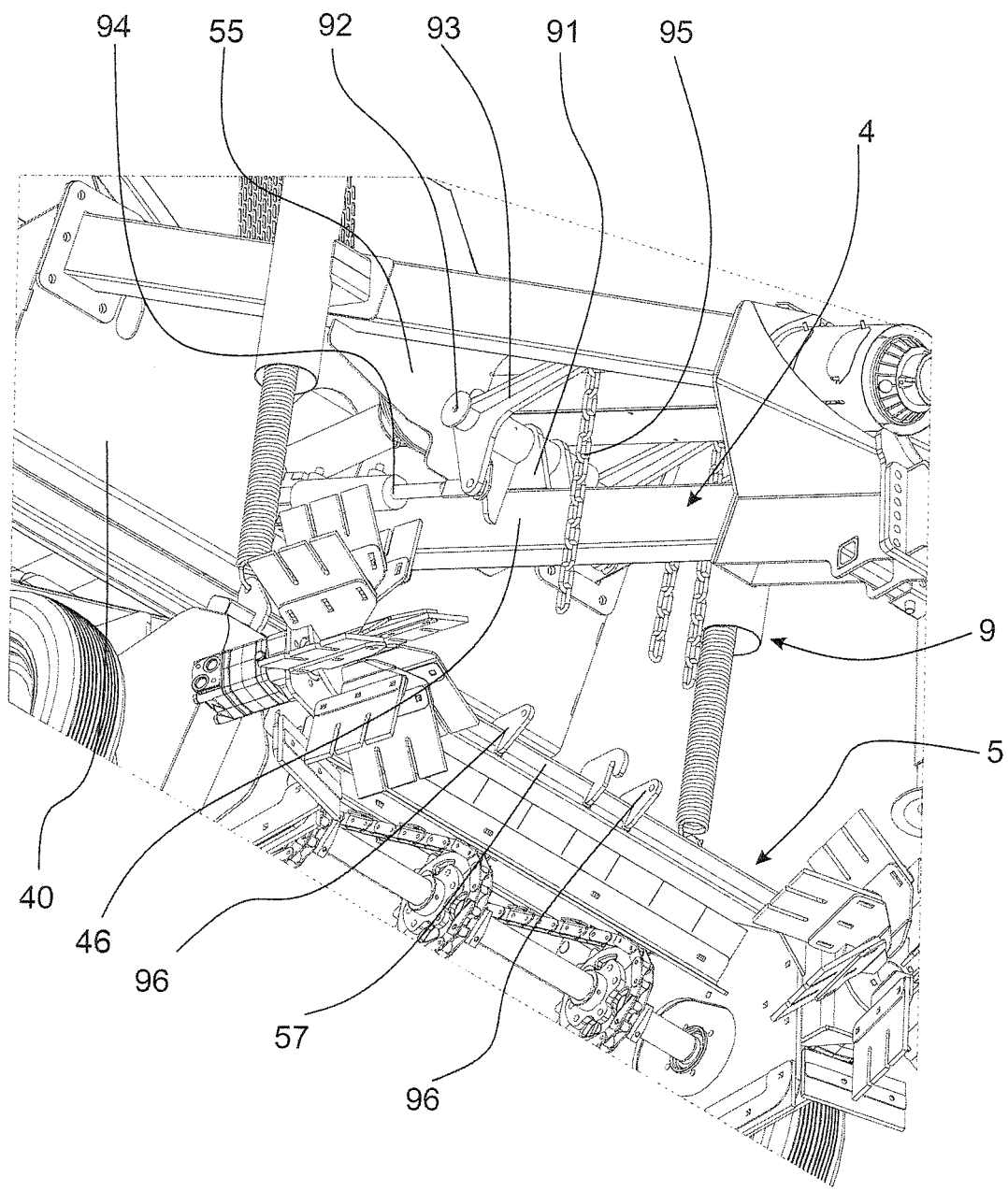
FIG. 16 shows an enlarged perspective detail, highlighting the embodiment of the hydraulic lifter for the collector set.

FIG. 16 shows details of the hydraulic lifter (10) which is constituted by a support (91) fixed between the lower tube (46) and the crosswise plate (55) of the coupling drawbar (4). Support (91) receives a crosswise shaft (92) which the edges of the L-shaped part vertices (93) are jointly fixed to, with one leg of the L-shaped part vertice (93) oriented downwardly and coupled to a hydraulic cylinder (94), while the opposed leg of the L-shaped part vertices (93) receives the upper end of chain (95). The lower end of chain (95) is adapted for coupling to hooks (96) that are provided on the crossbeams (57) of the collector set (5). Therefore, by activating hydraulic cylinder (94), it is possible to raise or lower the lower edge of the collector set (5), varying its position whether the machine is in operation or not. Moreover, the collector set can be safely secured in the raised position by attaching chain (95) to hooks (96), as will be readily understood by the skilled person.

Figure 17:
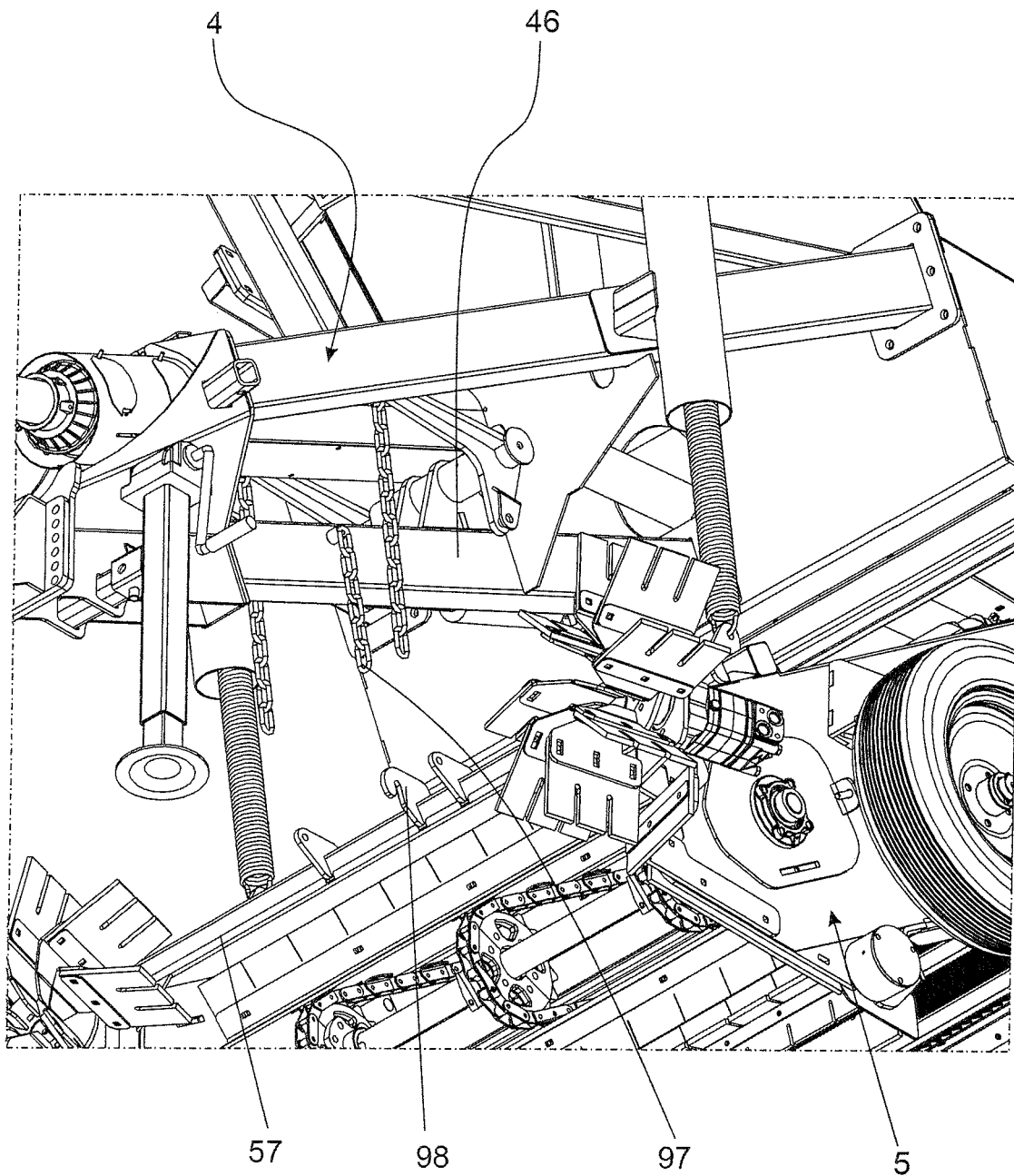
FIG. 17 shows another enlarged perspective detail, highlighting a chain provided to keep the collector set raised.

The enlarged detail of FIG. 17 shows another vertical chain (97) having its upper end fixed to the respective tube (46) of the coupling drawbar (4), while its lower end may be coupled to another hook (98) of the crossbeam (57) of the collector set (5), allowing the collector set (5) to be locked at the hinged position when required.

Figure 18:
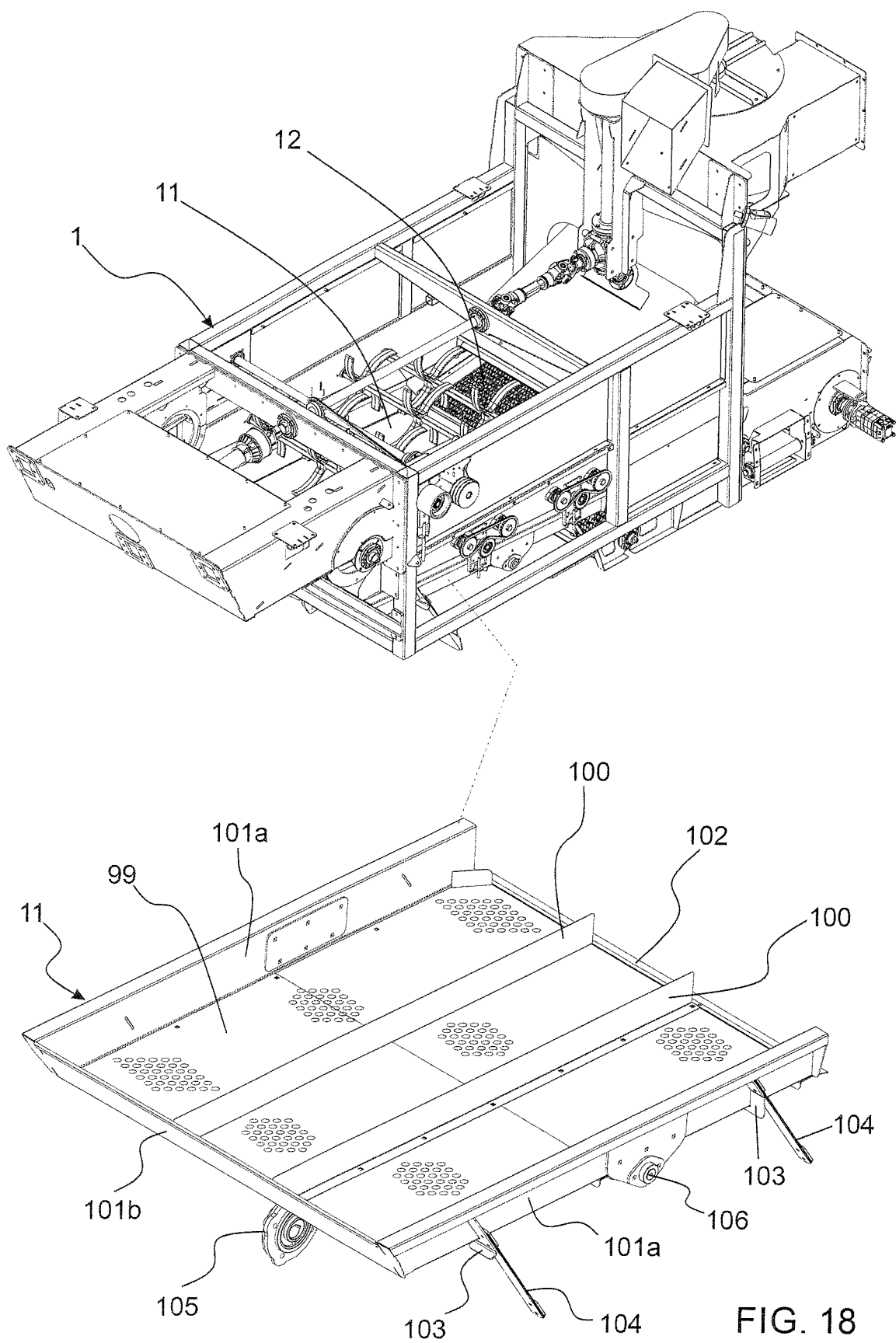
FIG. 18 shows an isometric view of a semi-assembled machine and a perspective view of the vibrating screen only, showing details of this embodiment.
Figure 19:
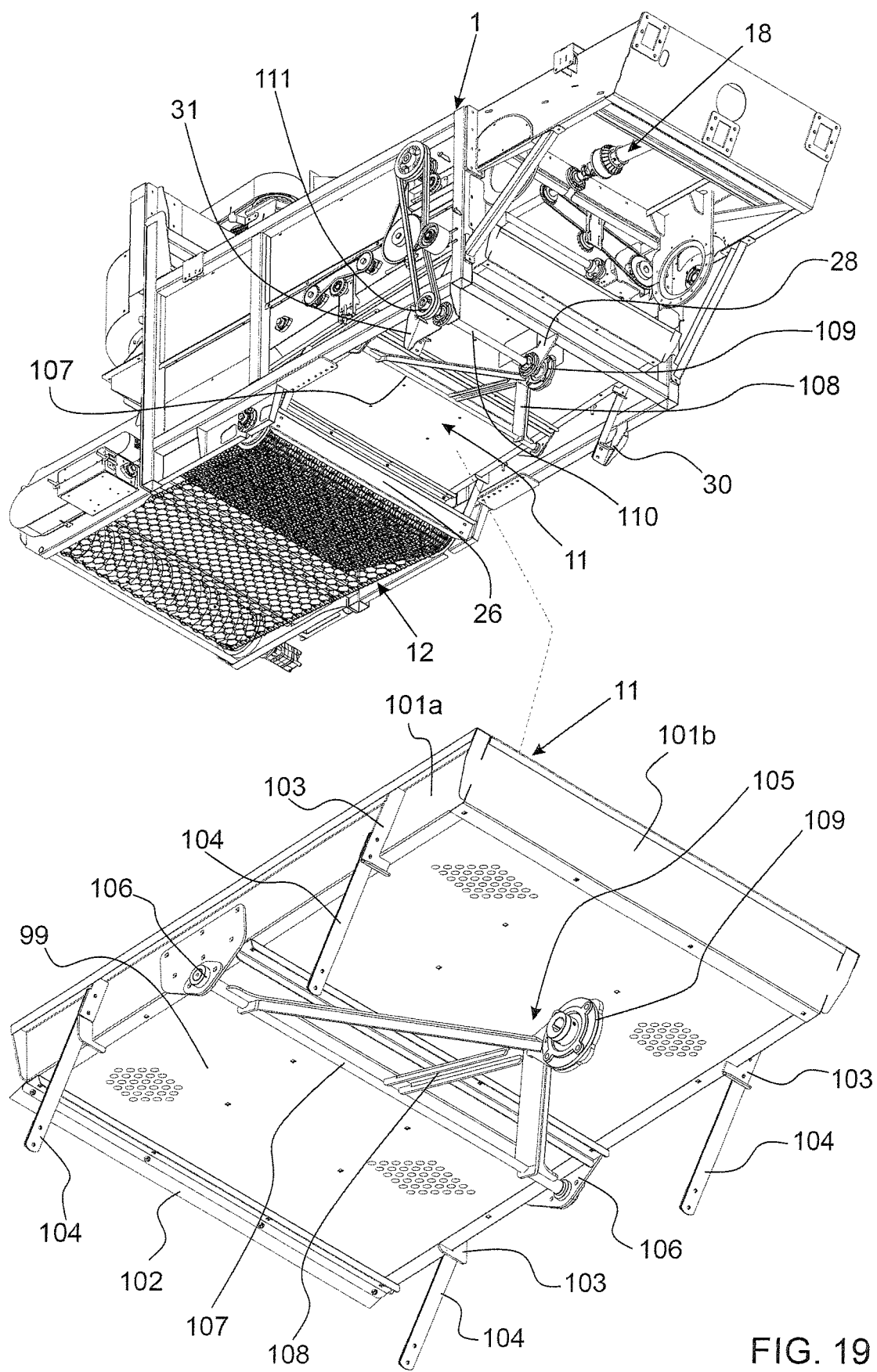
FIG. 19 shows the same view as FIG. 18, but from another angle, showing other embodiment details of the vibrating screen.

FIGS. 18 and 19 show the vibrating screen assembly (11) in detail. It is contemplated that vibrating screen assembly (11) having a bottom surface that is a screen (99) which is divided lengthwise by parallel walls (100) and also has three of its sides covered by side walls (101a) and a front wall (101b), the latter being positioned just before the outlet (64) of the collector set (5), while the other two sides are located behind the flaps (33) of the plates (32) of the chassis (1). The rear side of the screen (99) is open with a drainage flap (102) and is located over the front part of the selection screens (12). On the side walls (100), there are external supports (103) fixing the upper ends of sloped blade springs (104) while the lower ends of sloped blade springs (104) are respectively fixed to the supports (30), (31) and the crossbeam (26) of the chassis (1), so that the entire assembly may vibrate with the activation of a vibrator assembly (105) that is assembled to the lower side of the screen (99) and operably connected to side supports with bearings (106) which constitute a hinged support for the ends of a crosswise shaft (107) that is radially interconnected to a triangular arm (108). Triangular arm (108) has a vertex and an eccentric vibrator (109) which is secured to the intermediate support (28) of the chassis (1) and also coupled to the end of a shaft (110) which has an distal end that extends over and is supported by the support (31) of the chassis (1), after which it receives a pulley (111) for activation by means of the transmission set (18).

Figure 20:
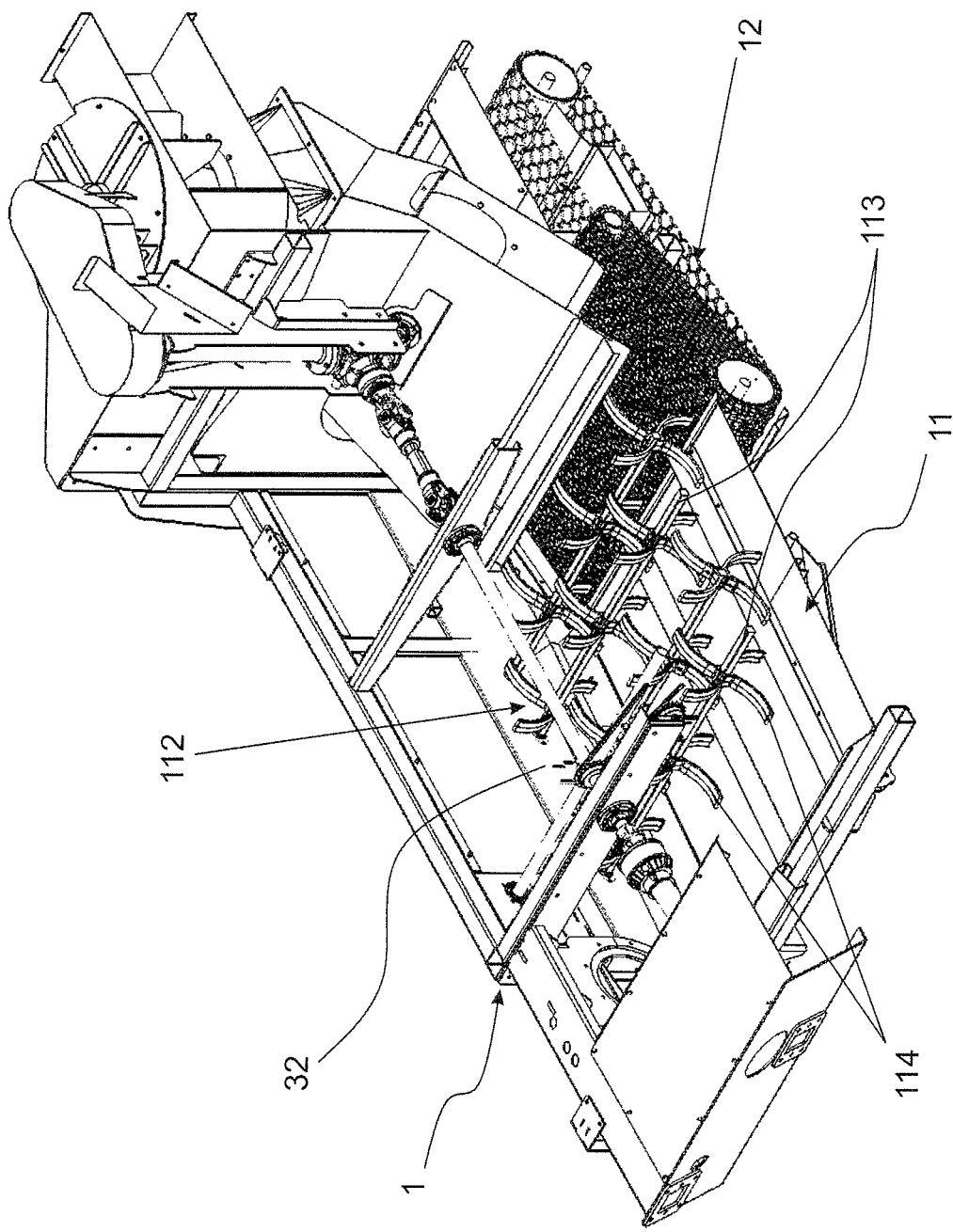
FIG. 20 shows an isometric view constituting an enlarged detail in lengthwise cutaway view, highlighting the pushing set.
Figure 21:
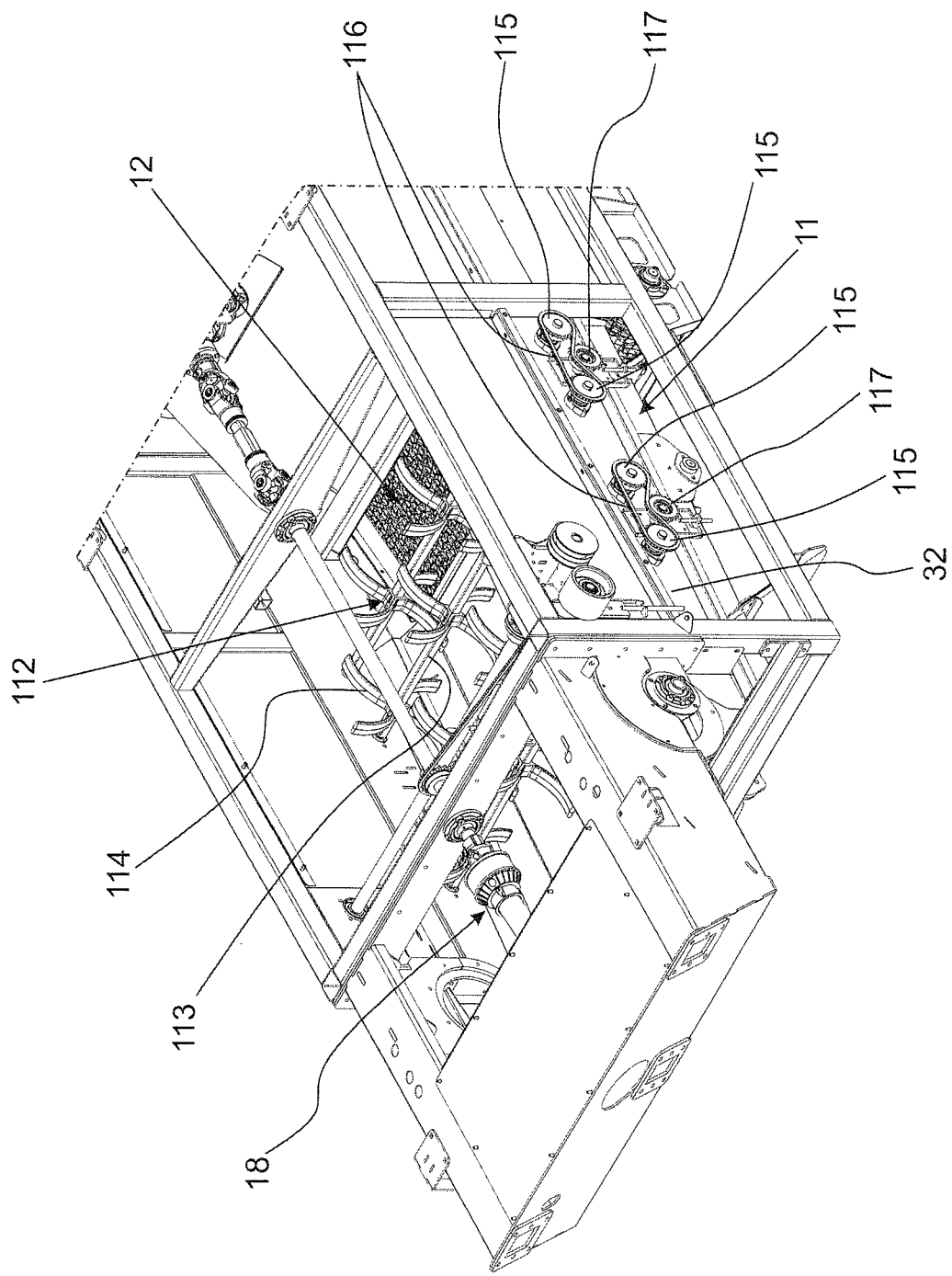
FIG. 21 is an isometric view constituting an enlarged detail, partially showing the machine and highlighting other details of this embodiment of the pushing set.
Figure 22:
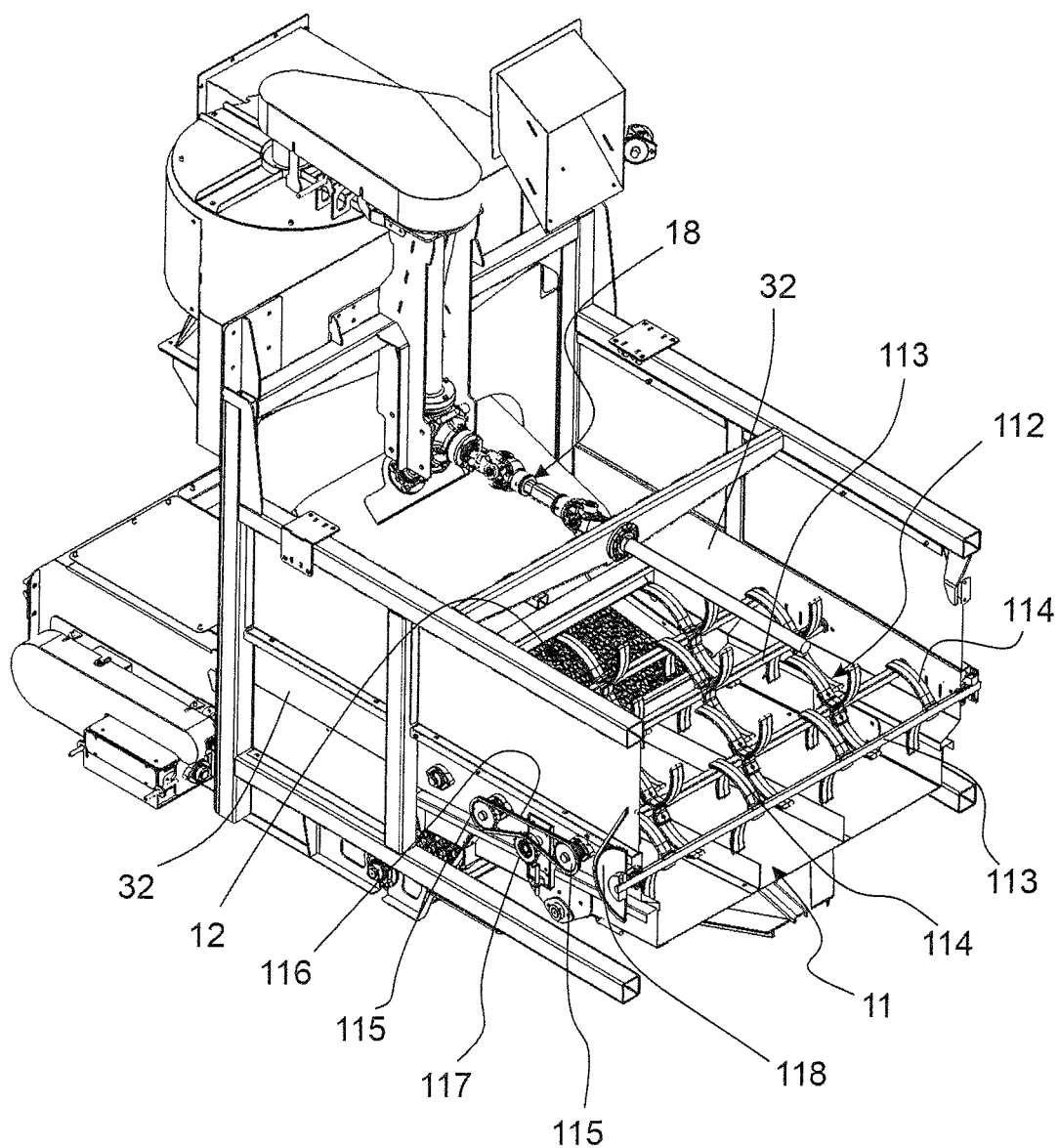
FIG. 22 shows an isometric detail of the pushing set of FIG. 21, but from another angle and in a crosswise cutaway view, highlighting other details of this embodiment of the pushing set.

FIGS. 20, 21 and 22 show the details of a pushing set (112) which is an integral part of the vibrating screen assembly (11). Pushing set (112) is formed by crosswise shafts (113), all of which include helices (114) that rotate immediately above the vibrating screen assembly (11) in order to push the screened material towards selection screens (12). Crosswise shafts (113) have their ends rotatably supported on the side plate closures (32) at which point these shafts receive gearings (115) and are operably connected and synchronized by chains (116) with respective chain tensioners (117), wherein at least one of the shafts (114) has a pulley (118) at its respective end to be activated by the transmission set (18). Therefore, all the material arriving over the screen assembly (11) is moved in a rearward direction, consequently passing through one more cleaning stages and wherein small particles (i.e.: particles smaller than nuts) are removed, and leaves, small branches and other debris also continue to move behind towards selection screens (12), where the nuts are separated from any such leaves and branches.

Figure 23:
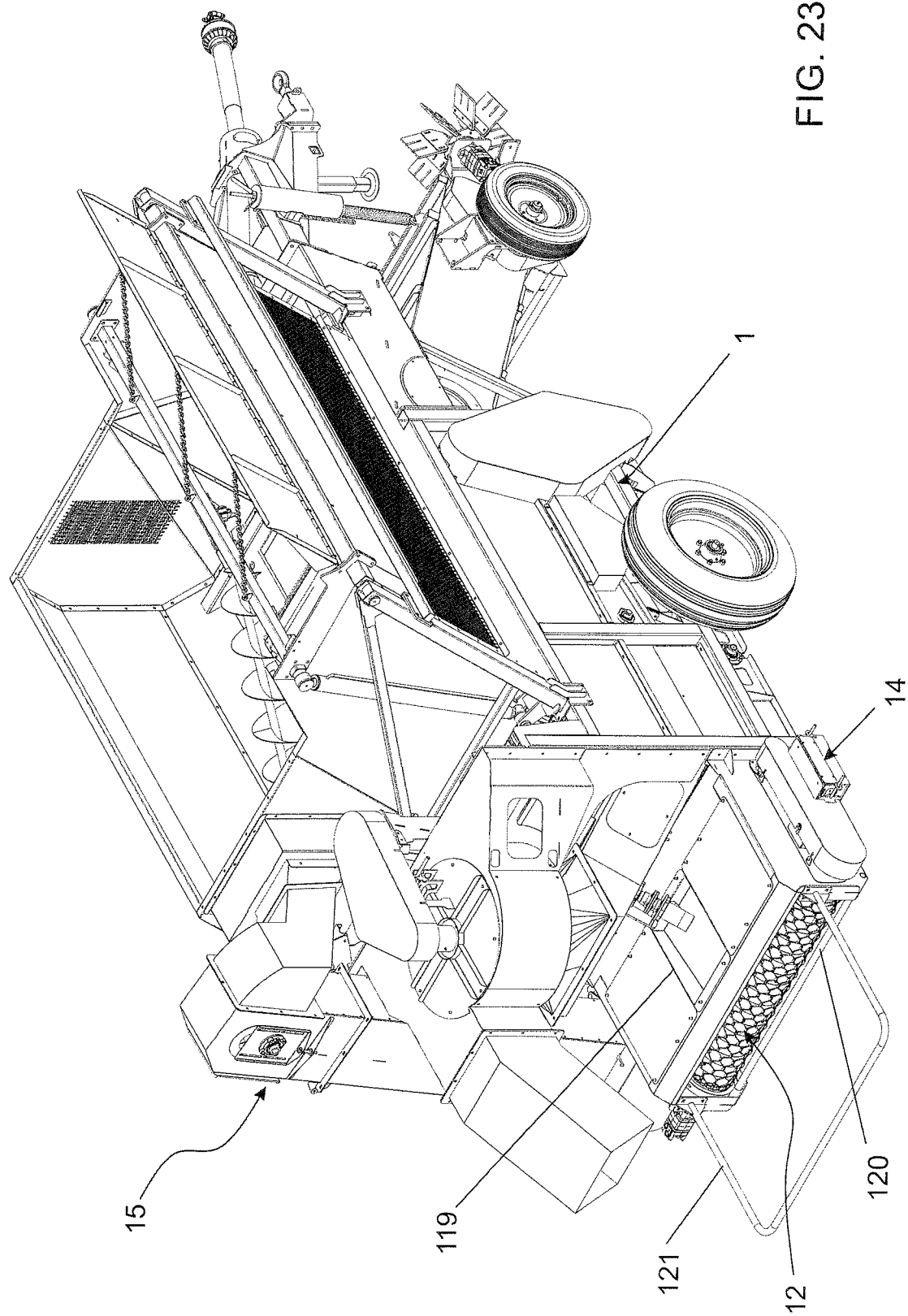
FIGS. 23 to 27 are various views and isometric details from different angles, showing details of the selection screens.
Figure 24:
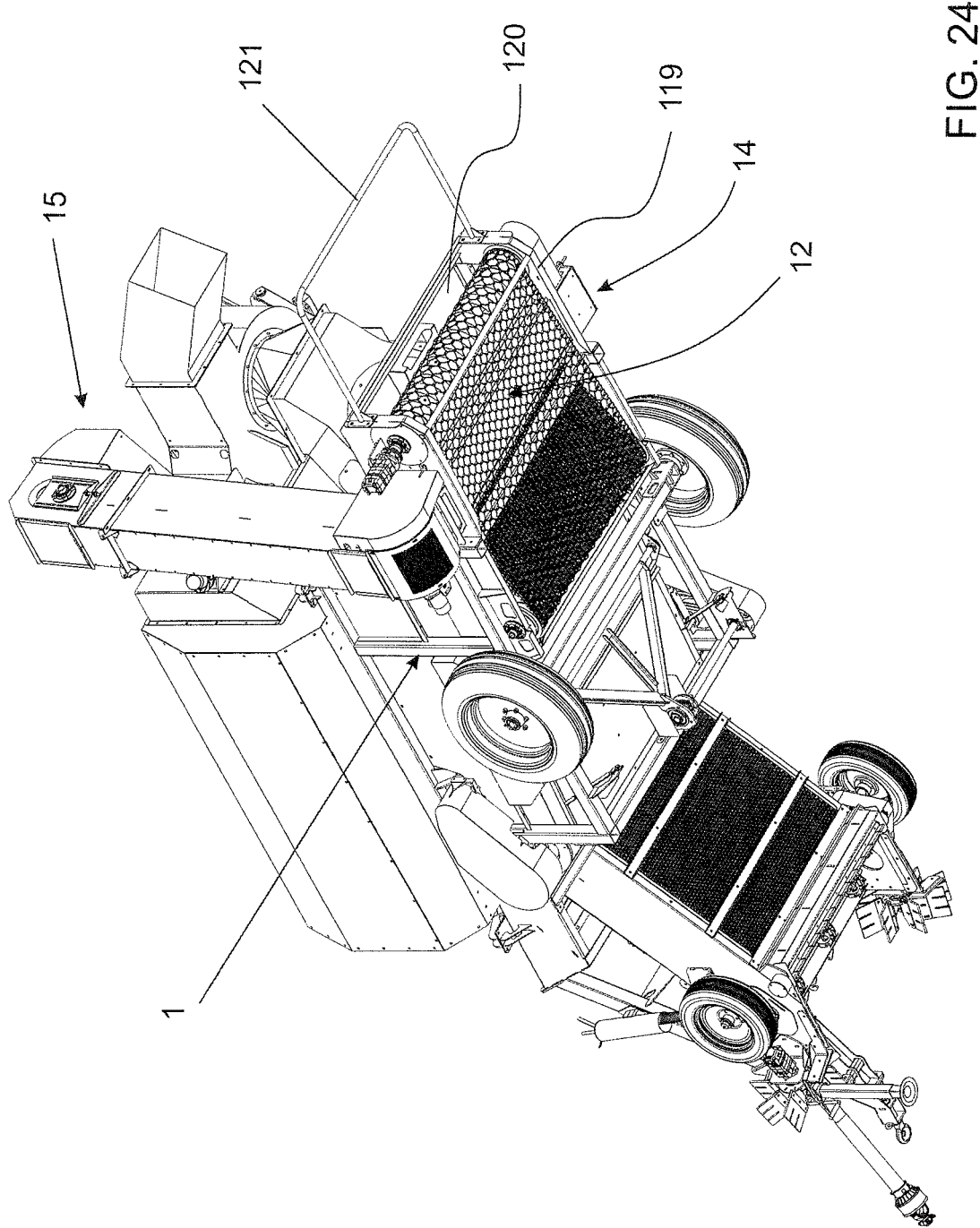

FIGS. 23 and 24 show details of the selection screens (12) which are assembled inside a rear extension (119) that is mounted in continuity with the lower surface of the chassis (1). This rear extension (119) is in the form of a case which is closed only on the lateral and upper sides, with the front side and the rear side remaining open as in a tunnel that defines an outlet (120) for undesired residues, especially leaves, branches and all kind of materials and debris that are larger than nuts. It is contemplated that the rear extension (119) has an outlet (120) covered by a rearwardly and horizontally extending "U"-shaped tube structure (121). Moreover, rear extension (119) extends the whole width of the chassis (1) and has a reduced height (approximately close to ⅓ of the chassis (1)) and provides a complementary assembly structure for cooperation with the selection screens (12), the crosswise conveyor (14) and the elevator (15) for clean nuts.

Figure 25:
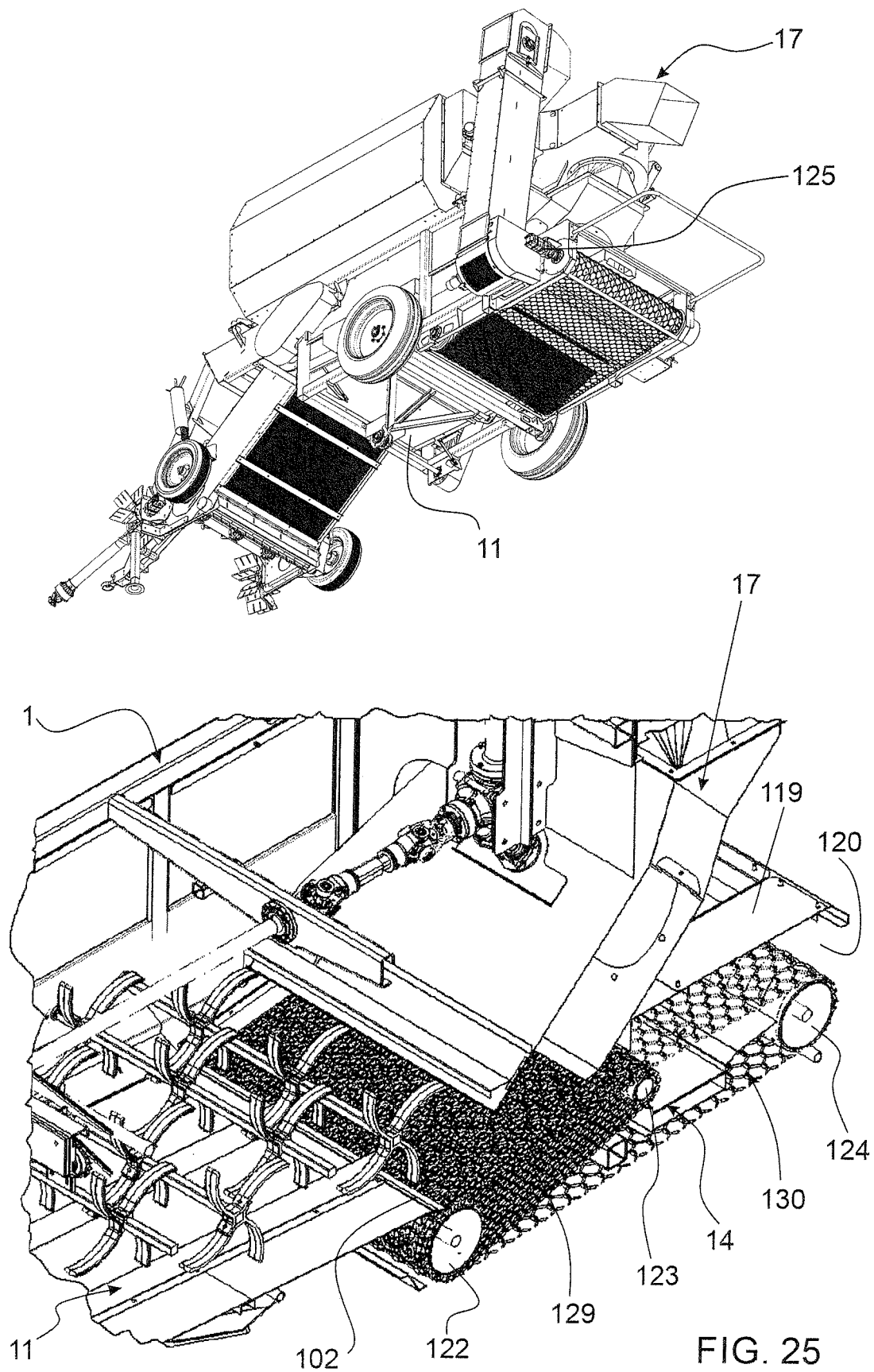
Figure 26:
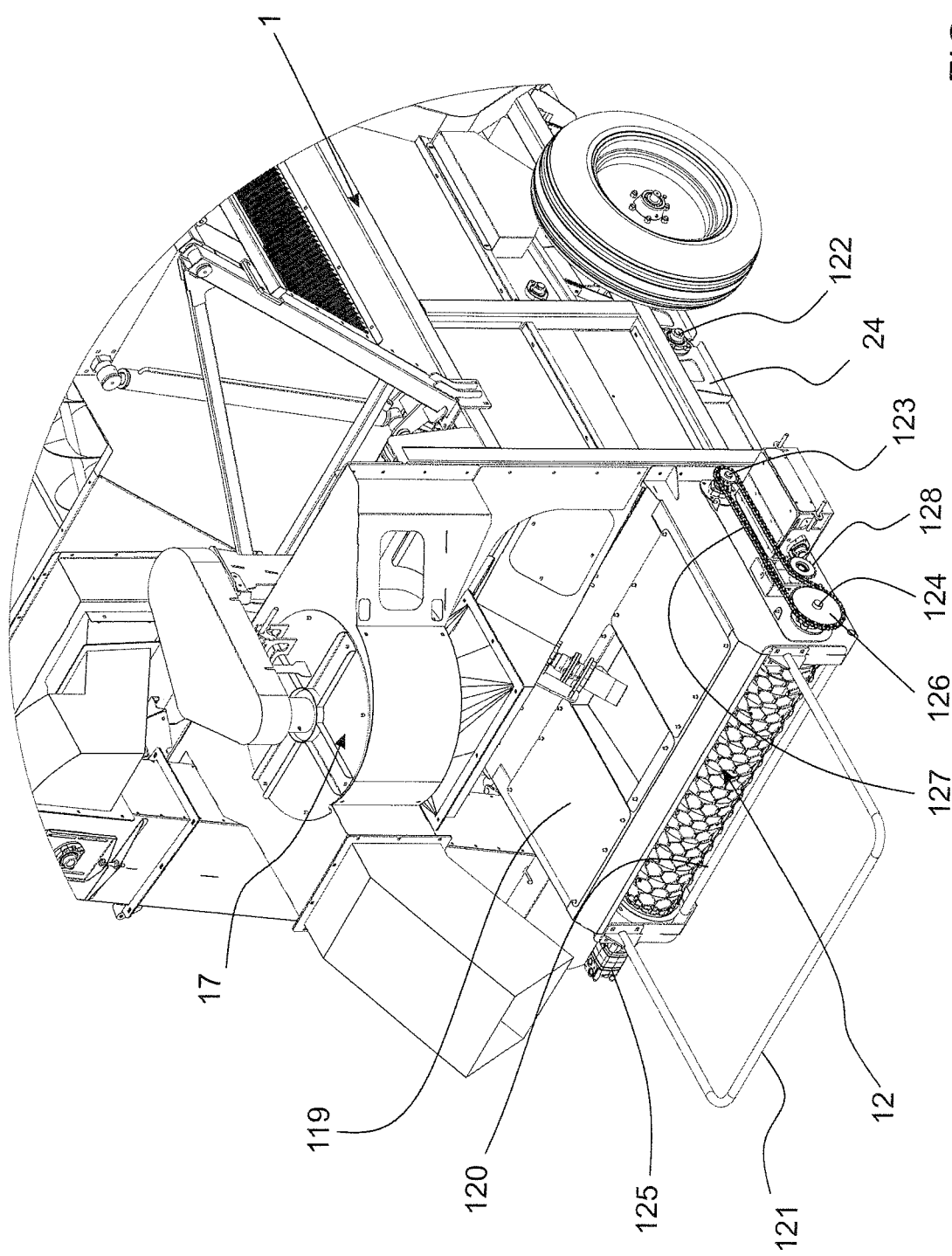
Figure 27:
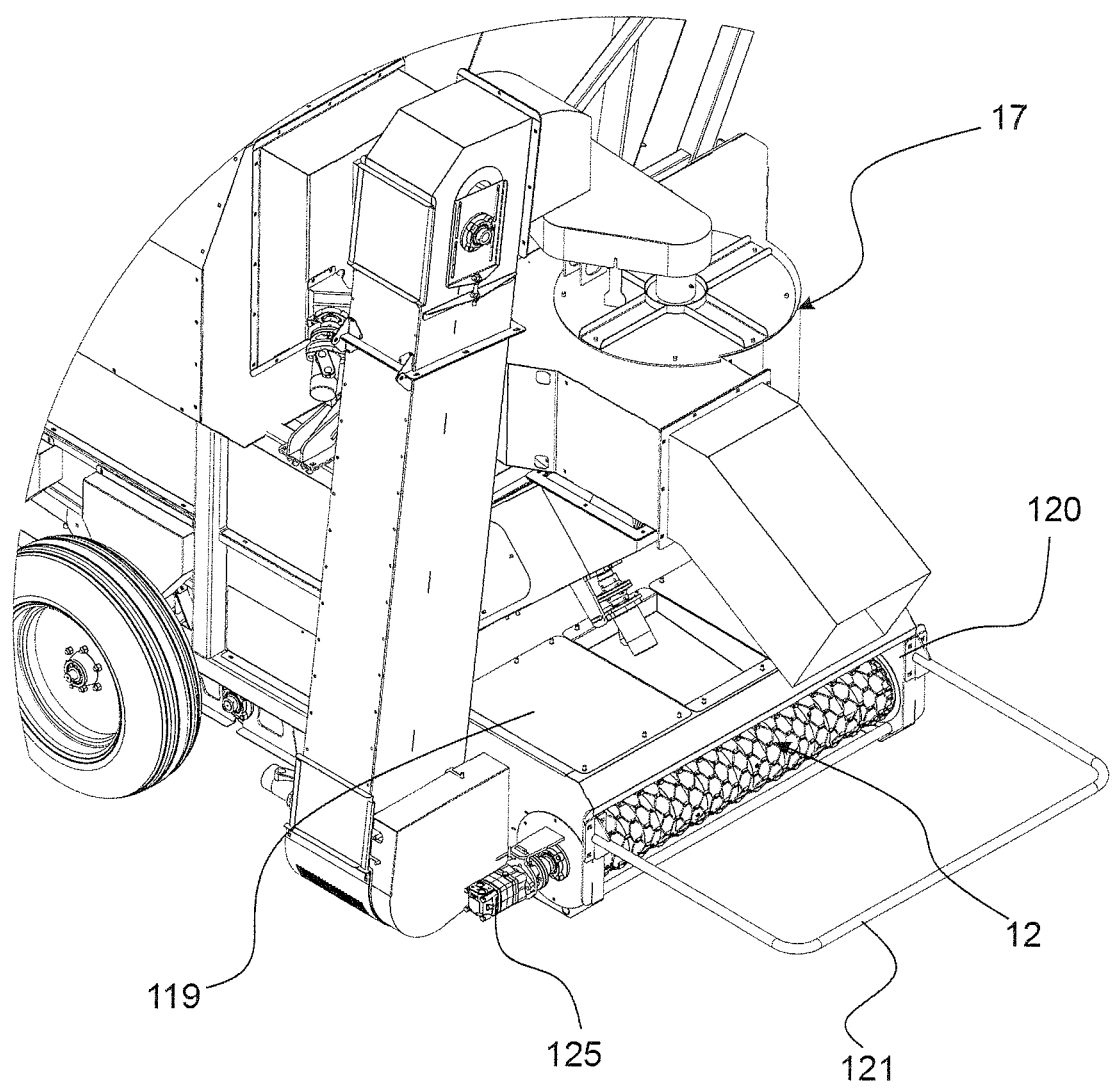

FIGS. 25 to 27 show the selection screens (12) in further detail, wherein it is contemplated that screens (12) further include three crosswise rollers: a front roller (122) located under the end of the vibrating screen (11), an intermediate roller (123) and a rear roller (124) located at the outlet (120) of the rear extension (119). The two latter rollers (123) and (124) are rotatably supported and mounted on the sides of the rear extension (119), while the roller (122) rotates freely and has its ends rotatably supported on the side plate closures (24) of the chassis (1), the rear roller (124) having one end coupled to a hydraulic motor (125), while its other end is synchronized with the roller (123) by means of gearings (126) and a chain (127) with a cooperating chain tensioner (128).

Turning to FIG. 25, a first belt-like screen (129) is suspended over the front (122) and intermediate (123) rollers and has a slightly smaller mesh size than a nut. This first screen (129) has its front edge located under the drainage flap (102) of the vibrating screen (11), while its rear edge ends exactly above the crosswise conveyor (14).

A second screen (130) is provided that is also belt-like and which has a slightly larger mesh size than that of a nut, is located rearwardly and in communication with the first screen (129), but is longer and covers the front roller (122) and the rear roller (124). As a result, second screen (130) also starts under the drainage flap (102) of the vibrating screen assembly (11) and extends to outlet (120).

Consequently, while in operation selection screens (12) receive the nuts from the vibrating screen assembly (11) which are still mixed with residues, especially leaves, branches and other debris which is bigger than the mesh size of selection screens (12). During the rearward displacement of this material, it is contemplated that a selective cleaning stage occurs. Nuts pass through the second screen (130), but they are initially retained by the mesh of the first screen (129). Under this condition, residues (leaves and branches) are kept over the second belt (13) having a larger mesh size, while nuts remain on the mesh of the first belt (129) with a smaller mesh size, which thereby prevents the passage of the nuts. Under this condition, lodged nuts and residues that remain on both belts pass through a first cleaning stage performed by the aspiration cleaning set (17); consequently, lighter materials are projected outside the machine by airflow, while nuts and heavier residues remain on the selection screens (12) continuing their rearward travel. Residues over the second screen (130) are projected outside through the outlet (120) and fall directly on to the ground, while nuts present on the mesh of the first screen (129) are now completely clean and as a result are released over the crosswise conveyor (14), which transports them to the elevator (15) and subsequently to the dump bucket (16).

Figure 28:
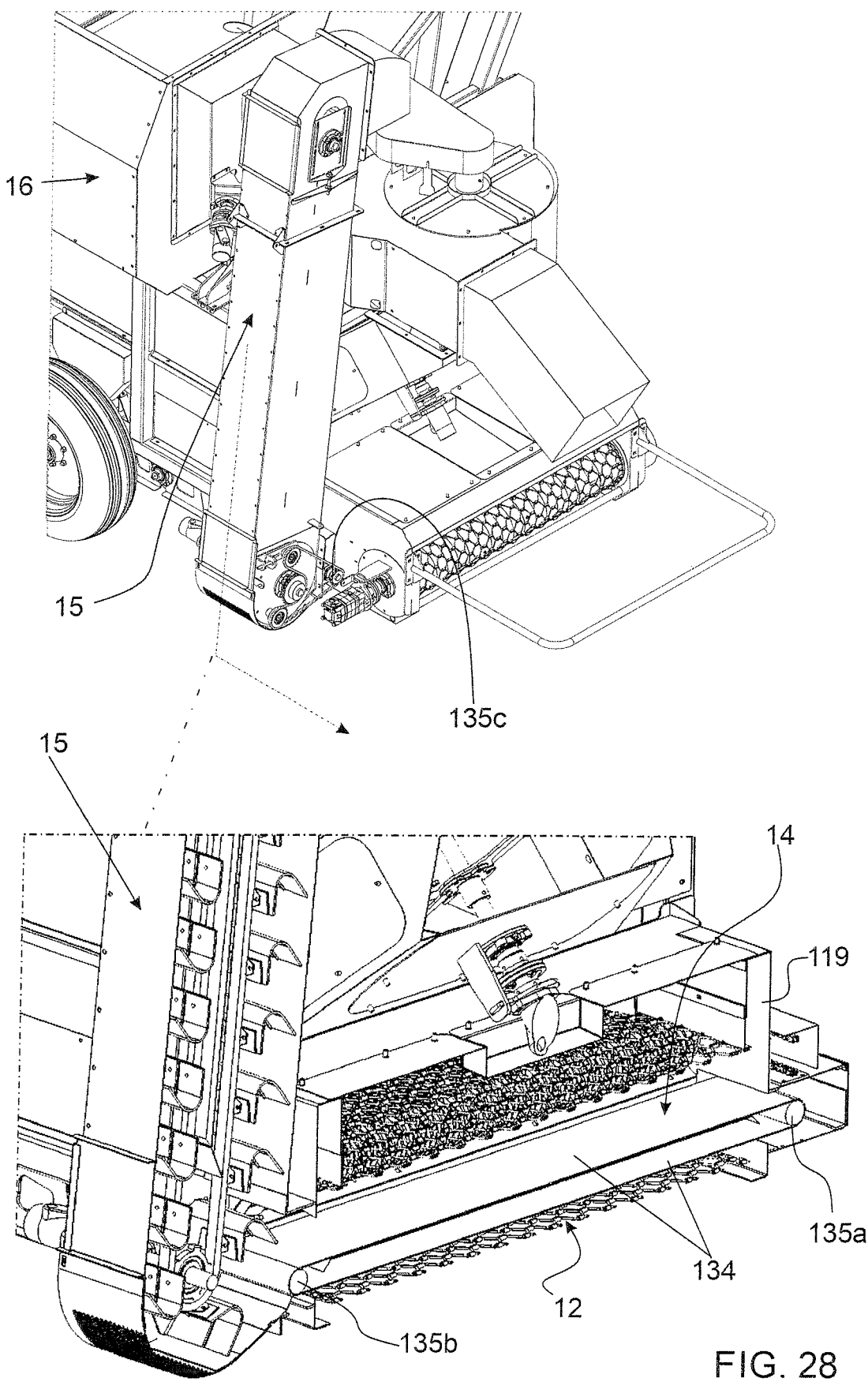
Figure 30:
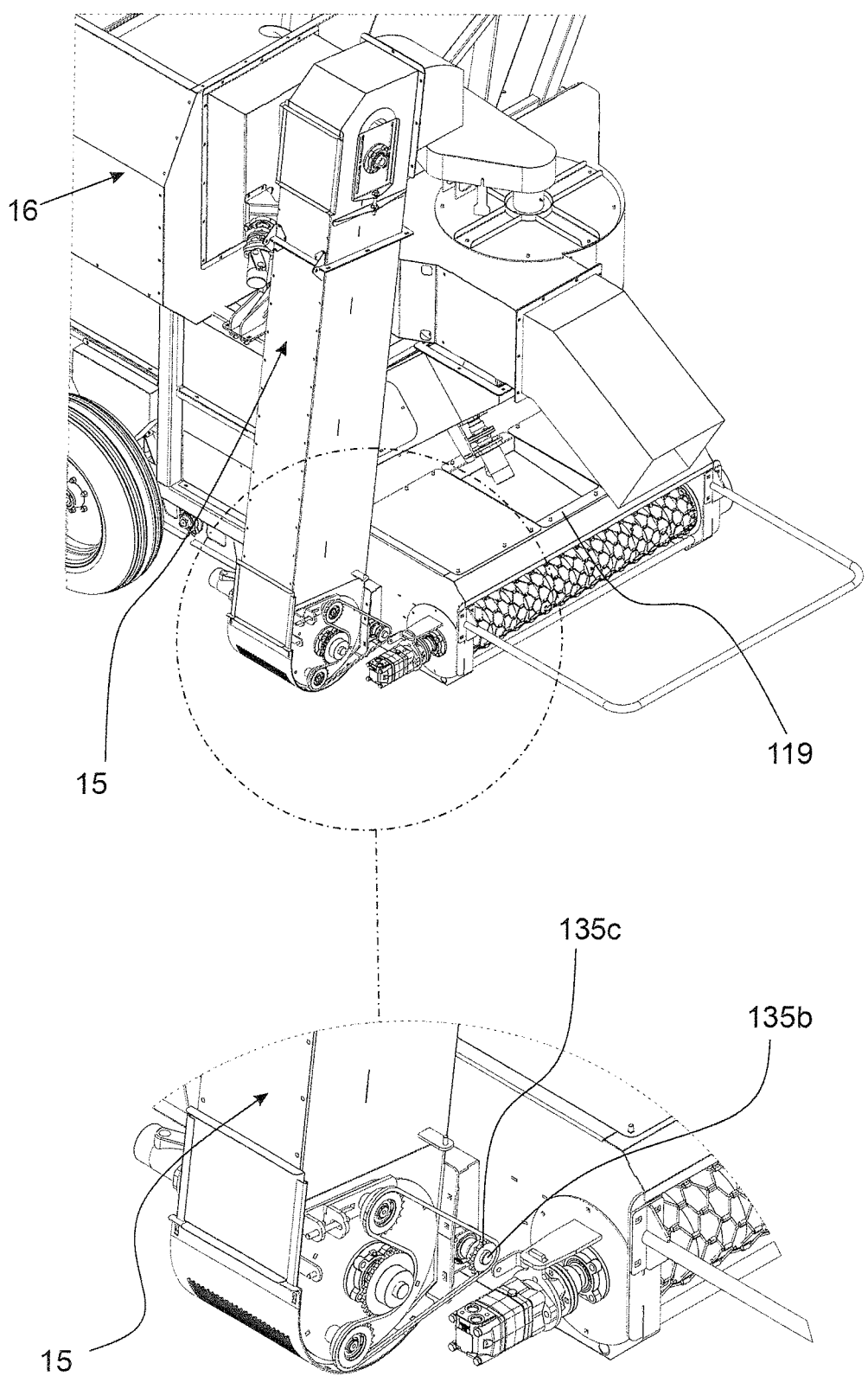
Figure 31:
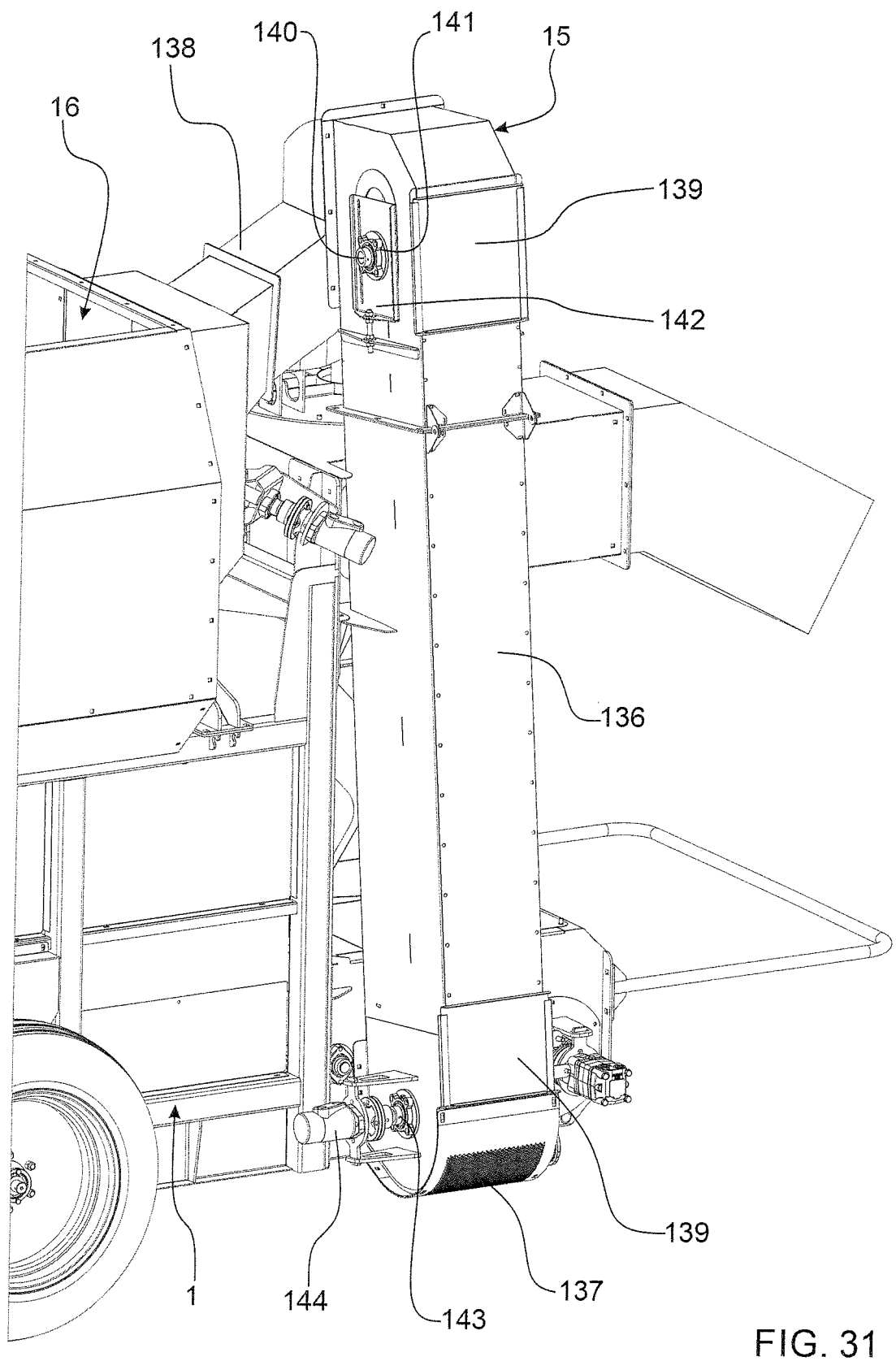
FIGS. 31 to 34 show various views and isometric details from different angles, showing the details of the clean nut elevator and the dump bucket.
Figure 32:
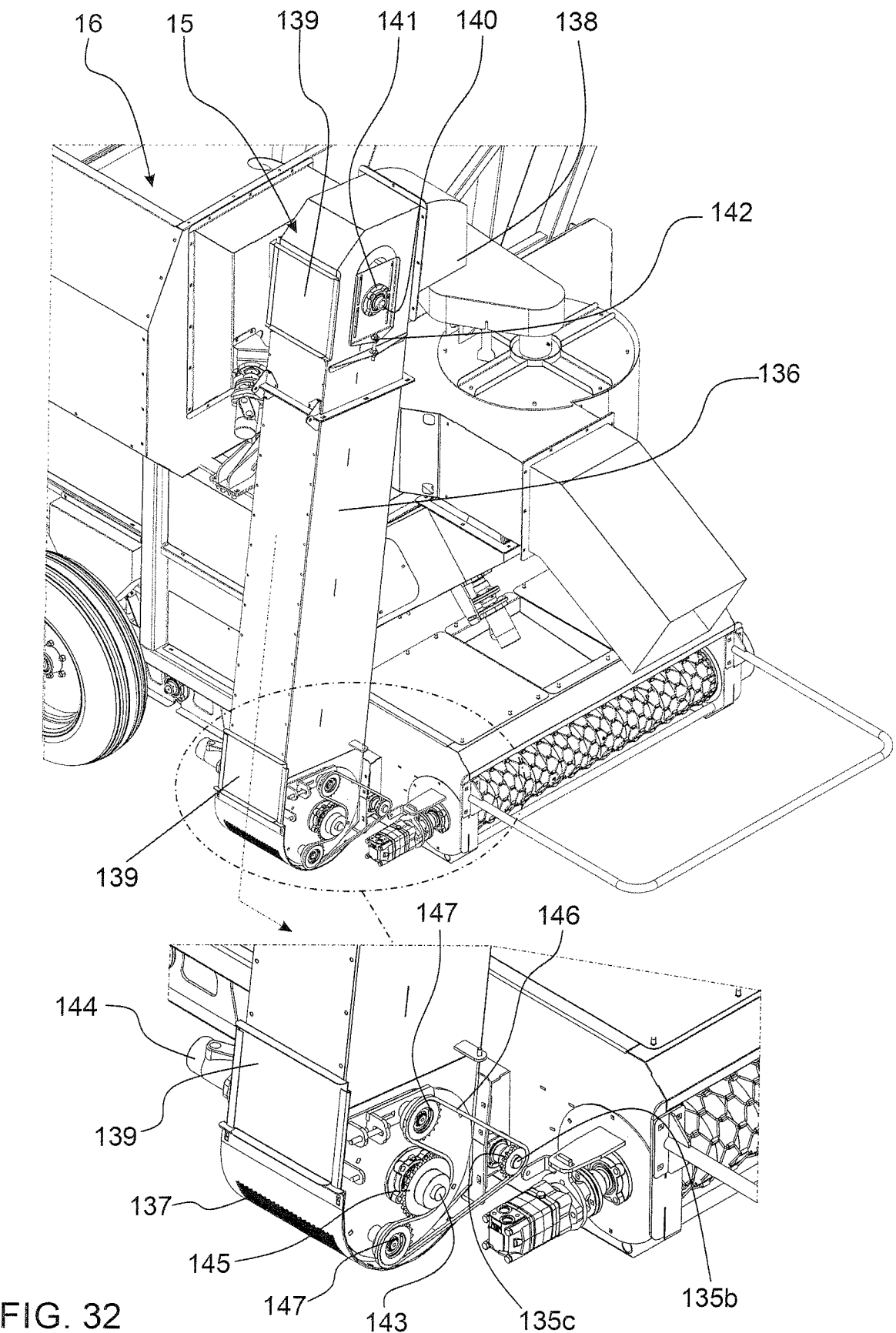
Figure 33:
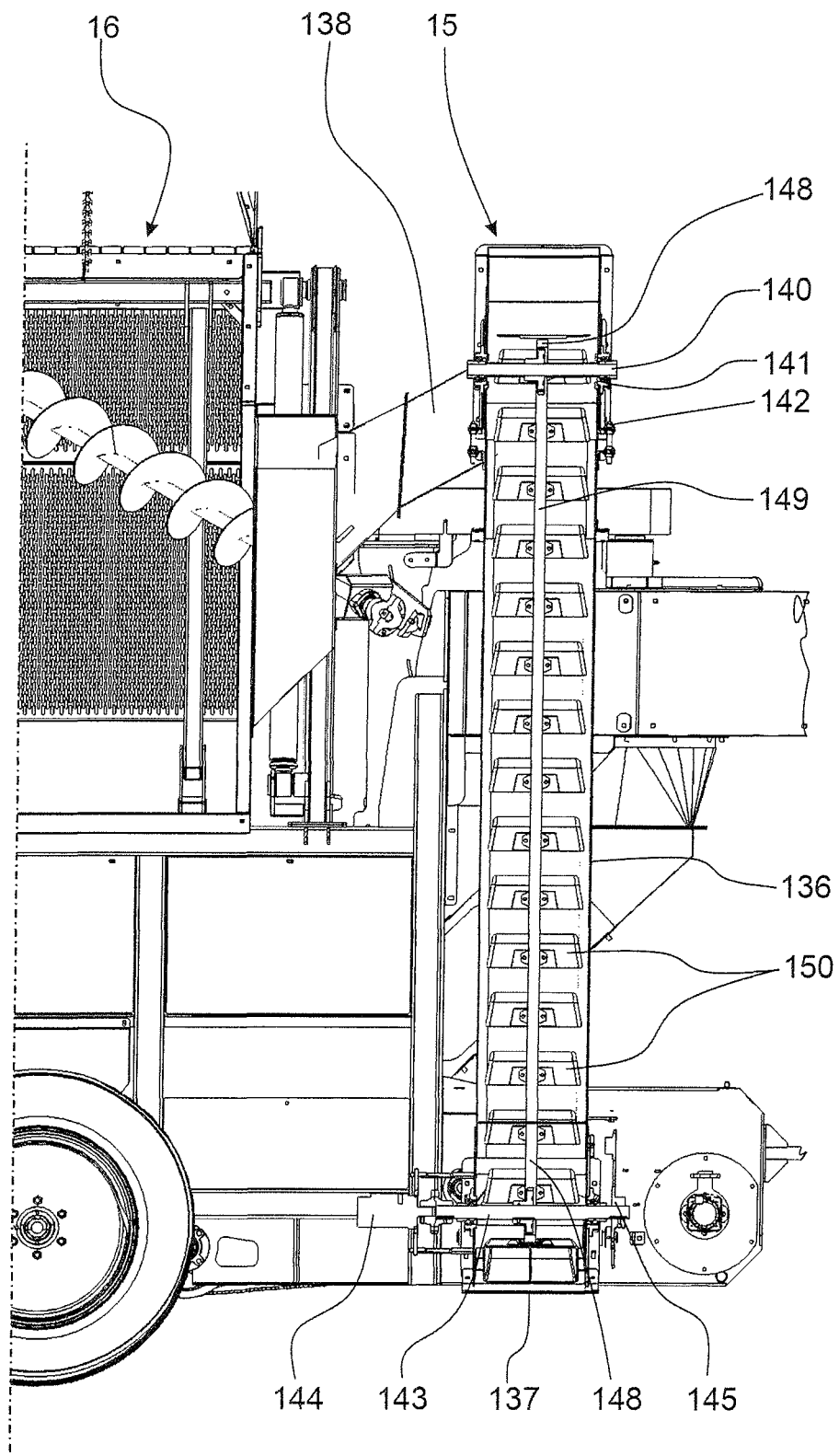
Figure 34:
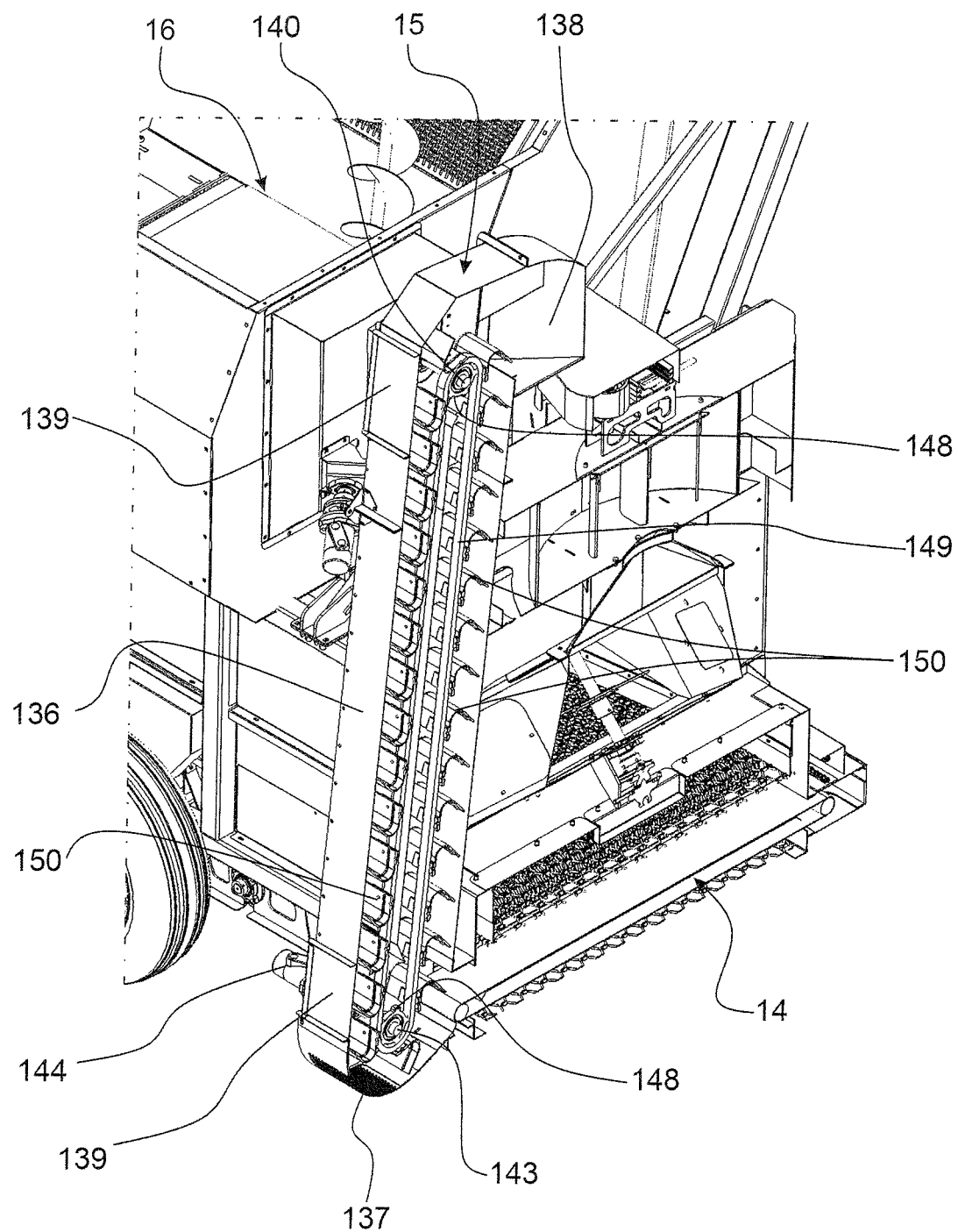
Figure 35:
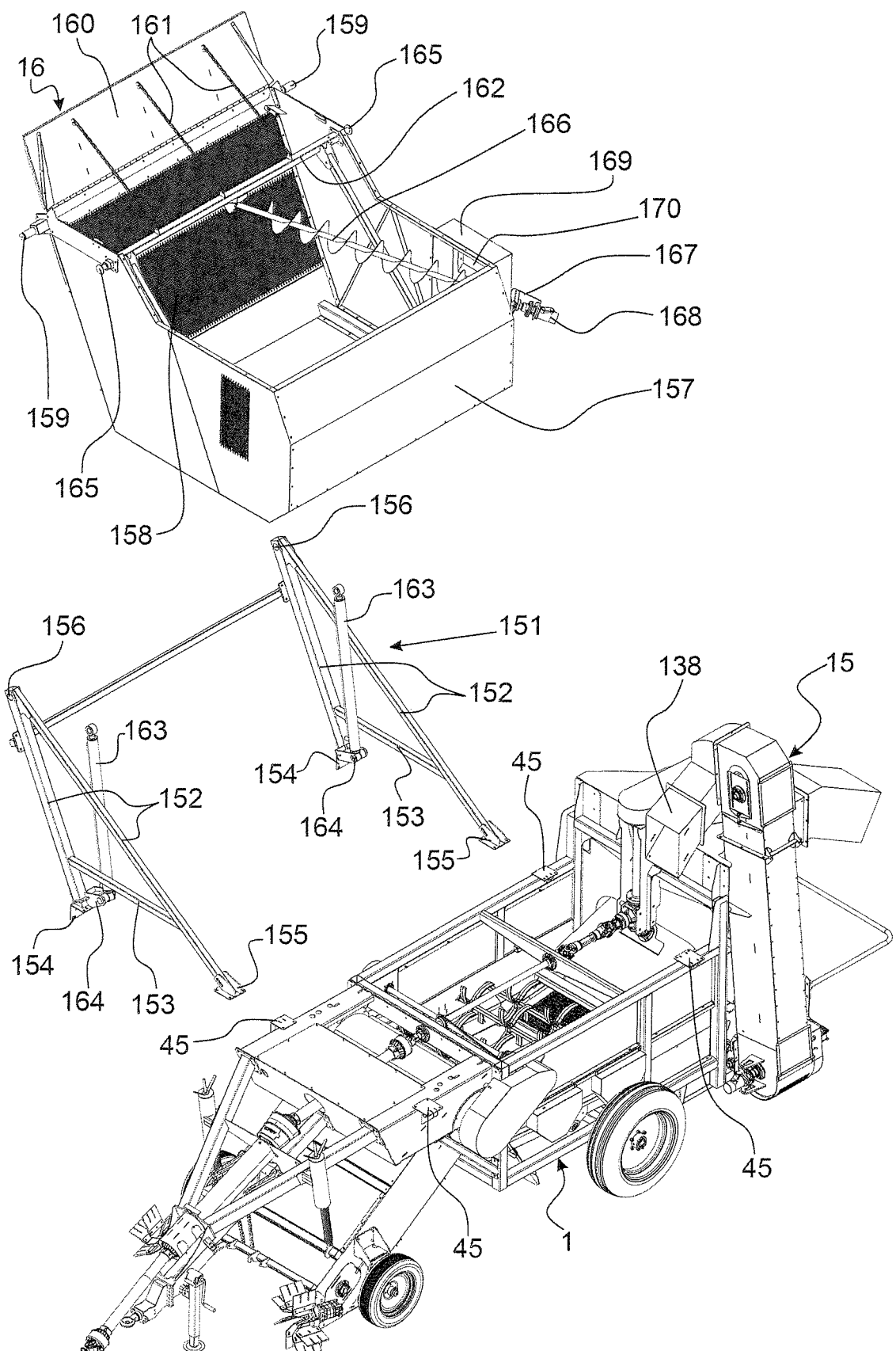
FIGS. 35 to 38 are perspective views and isometric details of an embodiment of the dump bucket, some of which are depicted in cutaway view.
Figure 36:
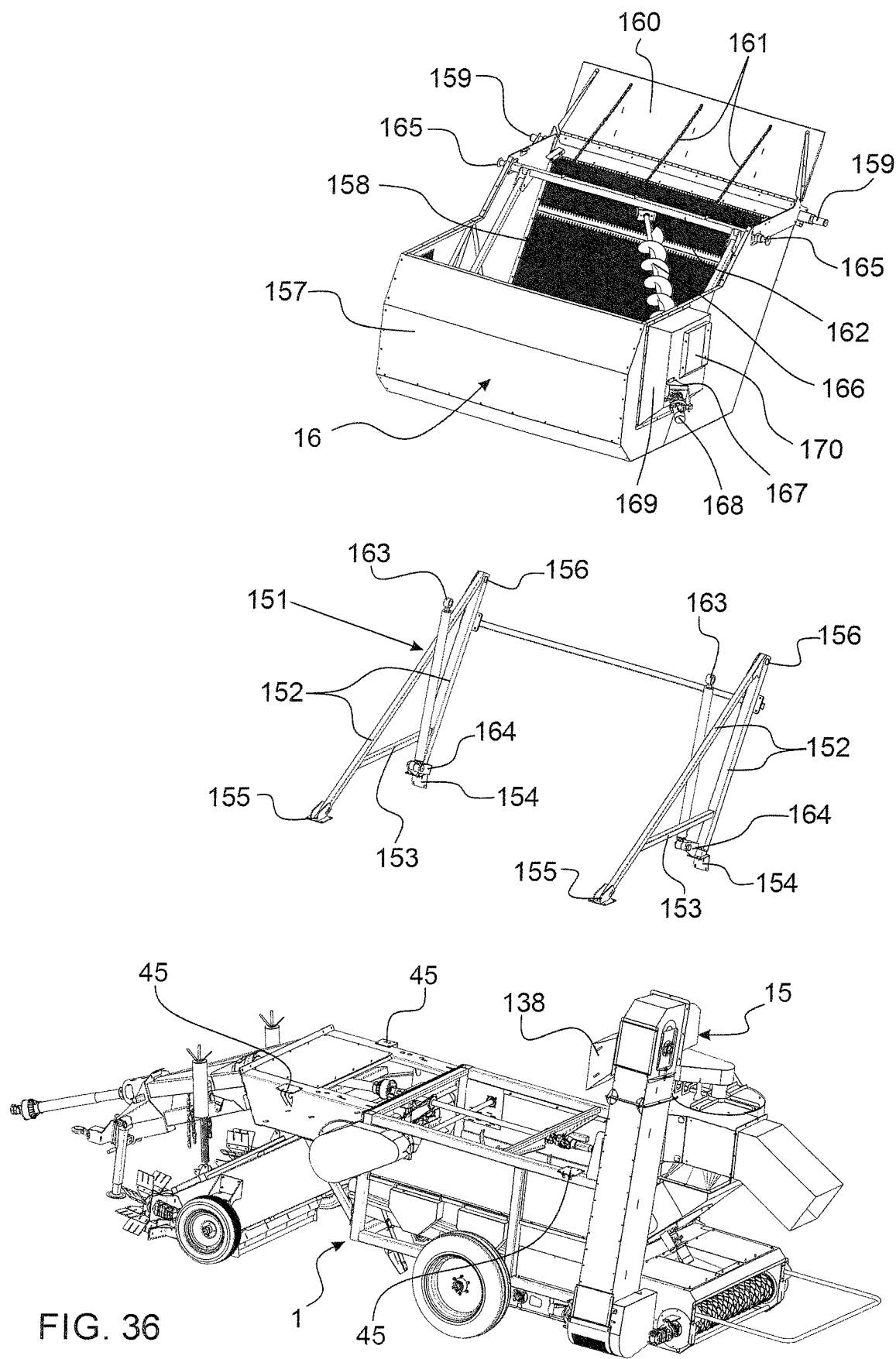
Figure 37:
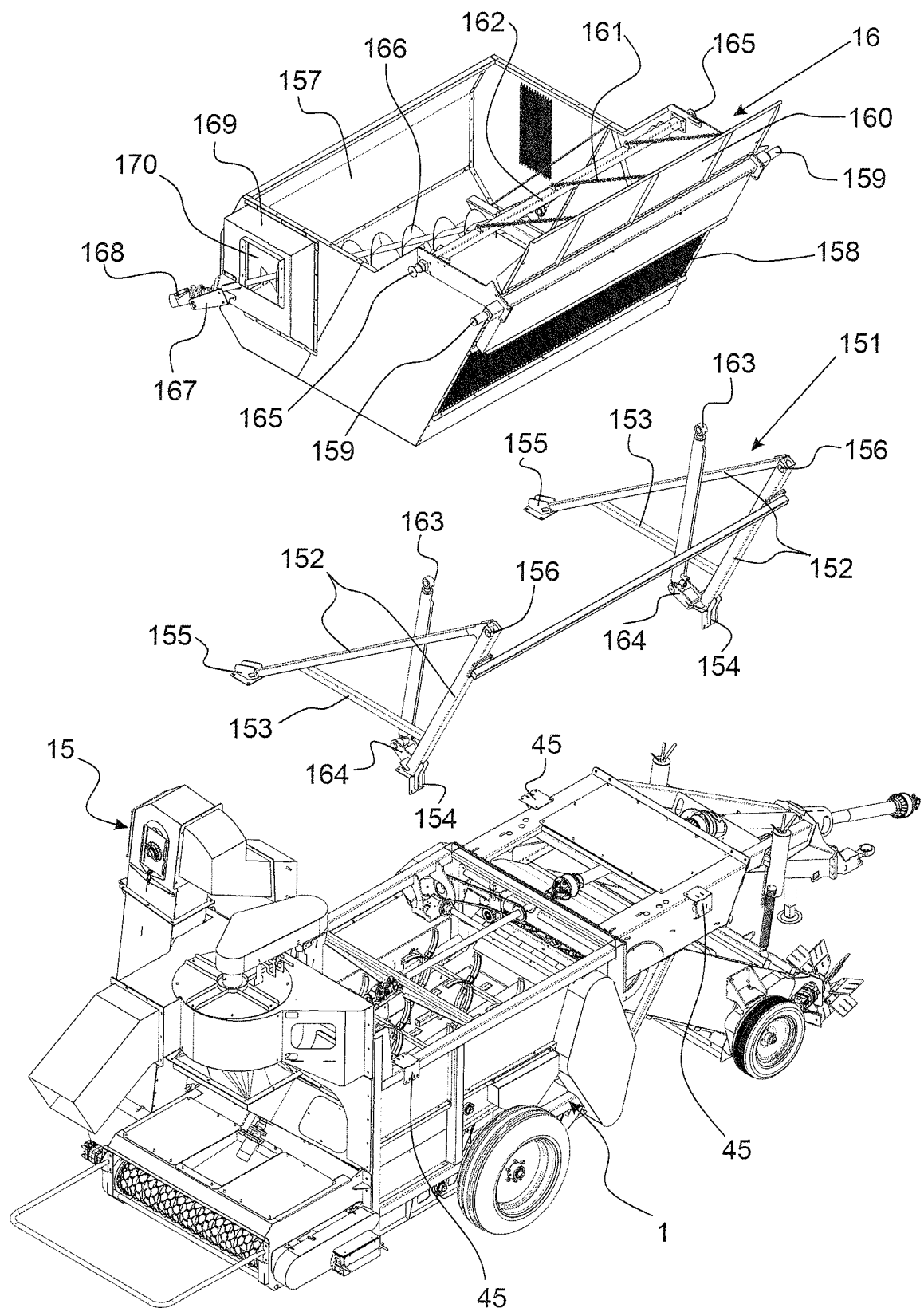
Figure 38:
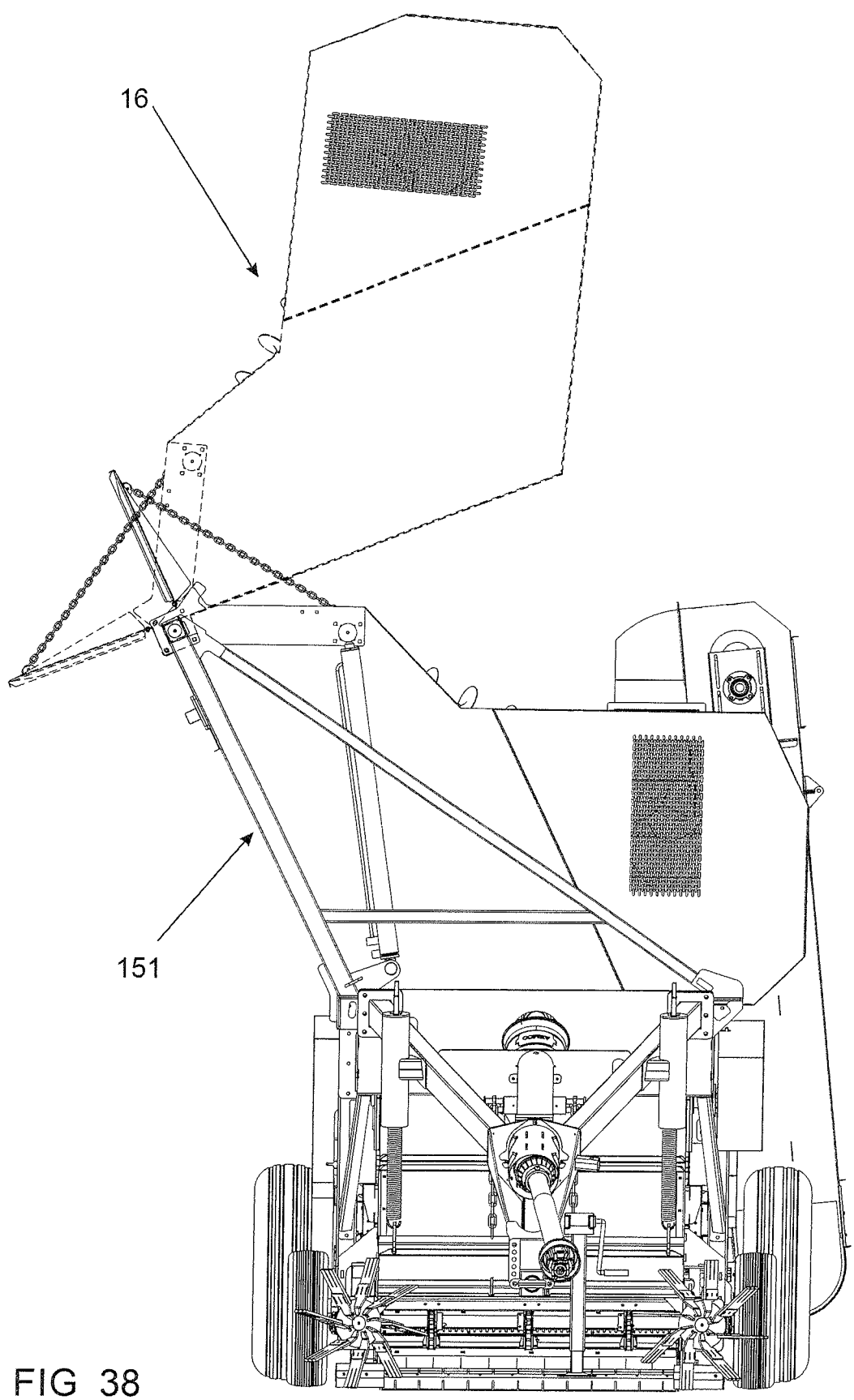

FIGS. 28, 29 and 30 show in detail the crosswise conveyor (14), which is contemplated to include a crosswise gutter (131) having ends that are fixed at respective points provided on the rear extension (119), one of which ends inside the lower edge of the elevator (15). The crosswise gutter (131) has its upper ends tilted outwardly in the form of flaps (132) and (133) that are respectively located under the roller (134) and adjacent to the roller (124) of the selection screens (12), so that the selected fruits may be guided into the crosswise gutter (131), given that a belt (134) is provided along the inner side of the gutter (131). Belt (134) is supported over two shafts/rollers, one on the right (135a) and one on the left (135b), the latter having an end with provided gearing (135c) to receive rotational power provided from the elevator (15). Consequently, all the fruits falling over the crosswise conveyor (14) are effectively guided into the elevator (14) and from there are subsequently deposited into the dump bucket (16).

FIGS. 31 to 34 show the elevator (15) for clean nuts in detail, which is contemplated to include a nearly vertical tube (136) which is slightly tilted inwardly and has its lower end rounded and which includes a screen-like closure (137) and which is in communication with the end of the crosswise belt (14). The upper end of elevator (15) extends inwardly and forwardly and as a result forms a sloping outlet tube (138) that flows into the dump bucket (16). The tube (136) has a sliding inspection doors (139) and also has an upper shaft (140) and respective bearings (141) fixed to supports with sliding regulation (142) assembled on the respective walls of the upper end of the tube (136). It is also contemplated that a lower shaft (143) is provided, which, on the other hand, has one end rotational coupled to a hydraulic motor (144), while its other end has gearings (145) which, by means of a cooperating chain (146) and respective chain tensioners (147) is rotatably interconnected to the gearing (135c) provided on the shaft (135b) of the crosswise conveyor (14).

It is further contemplated that each one of the upper shaft (140) and the lower shaft (143) are equally provided with gearing (148) which in turn receives and rotationally cooperates with chain (149). It is further contemplated that chain (149) is interconnected by a plurality of conveyor shells (150) which, while in operation, bend over into a stowed position on the inner side of the machine while, on the outer side, their mouths remain turned outwardly and upwardly when loaded; consequently, when they pass through the rounded opening on the screen (137), each shell is loaded with clean nuts coming from the crosswise conveyor (14) and subsequently transported upwardly and when they reach the upper part of the elevator (15) they bend over again and the transported content flows to the outlet tube (138) and as a result clean nuts fall by gravity into the dump bucket (16).

The dump bucket (16) is shown in detail in FIGS. 35 to 38. It is contemplated that dump bucket (16) has a bottom with appropriate measurements and orientation to smoothly abut the chassis (1) and is assembled jointly with a rack-like structure (151) having four downwardly projecting feet (152) which are interconnected in pairs by crossbeams (153) and which are all sloped to the right side of the machine. The lower ends of feet (152) have shoes (154) and (155) which are fixed to the supports (45) provided on the upper side of the chassis (1), while on the respective upper ends, each pair of feet is joined at a hinging point (156). An interconnection beam is provided beneath and between the pairs of feet (152) and the hinging points (156) and due to the outwardly sloping shape of foot (152), extends outwardly over the right side of the machine. The dump bucket (157) has a corresponding sloped shape to that of rack-like structure (151) and has a screen-like side (158) that extends upwardly higher than the adjacent sides, is equally sloped and has upper corners having fitting pins (159) in the hinging points (156) of the rack (151). On that same side, the upper edge of the dump bucket (157) has continuity in the form of a hinged drainage ramp (160) that has its opening limited by chains (161) which interconnect its free edge to an upper crossbeam (162) and, therefore, the drainage ramp (160) may open until it is positioned coplanar with the screen side (158) and may close further until its free edge remains over the crossbeam (162). It will be readily understood that a hydraulic cylinder (163) is provided to assist with moving the dump bucket (157). The lower end of hydraulic cylinder (163) is hinged to a complementary support (164) and integrated with the shoes (154) of the feet (152), while its upper ends are equally connected in a hinged fashion to pins (165) which existing on the edges of upper crossbeam (162), also serving as a rotating point of support for one end of a diagonally oriented spreading screw (166) while the other end is rotatably supported and mounted to a support (167) and is coupled to a hydraulic motor (168). Therefore, the rotation of the spreading screw (166) allows bulk nuts inside the dump bucket to be constantly leveled so that they do not form a peak.

The dump bucket (157) has an alignment dome (169) on the side that faces the elevator (15), the dome including an opening (170) that aligns with the sloping outlet tube (138), wherein the alignment occurs by approximation, thereby permitting the bucket (157) to tilt at the desired time for unloading and, when the dump bucket returns to its loading position, the dome remains perfectly aligned with the sloping outlet tube (138).

Figure 39:
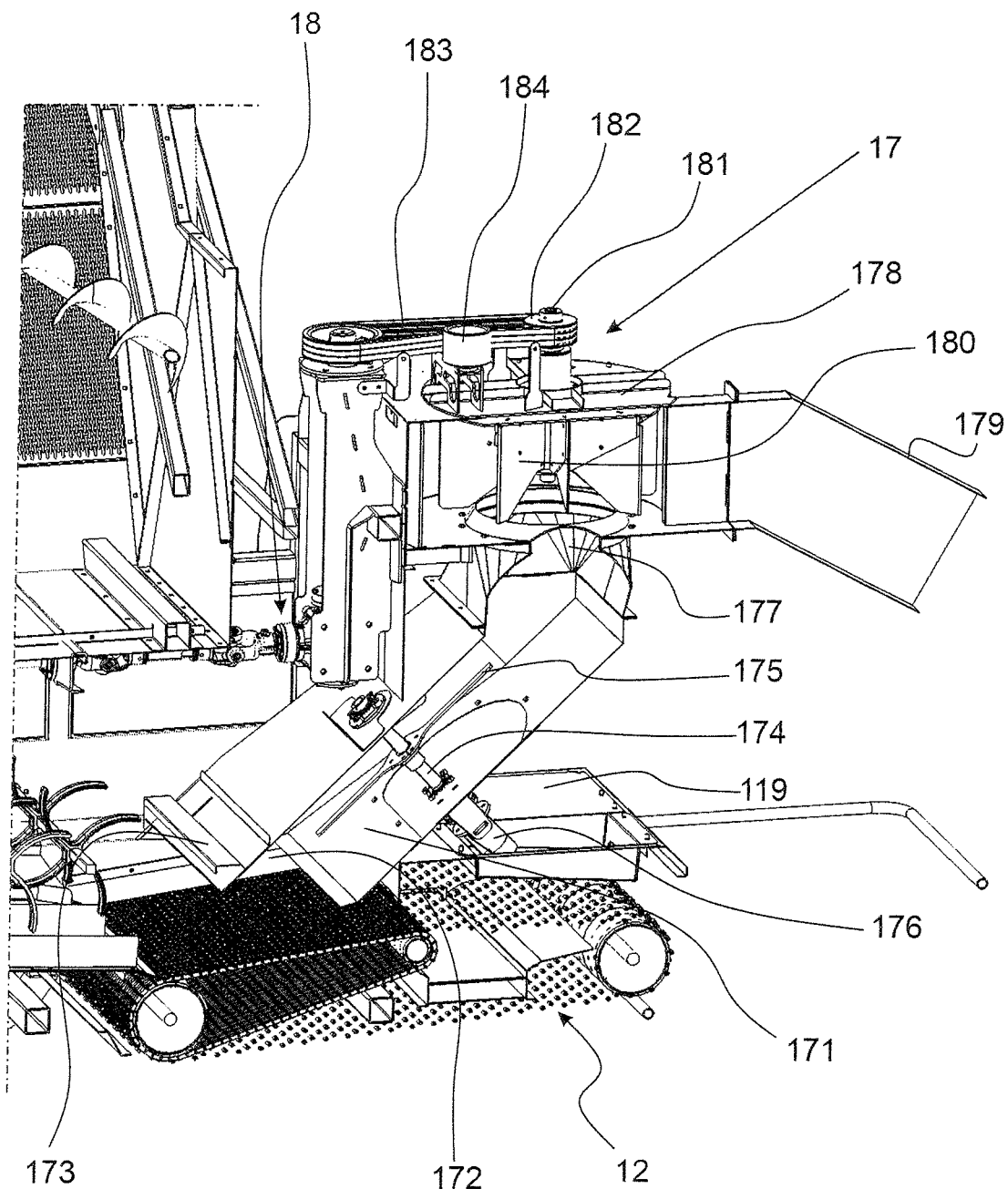
FIG. 39 is an isometric cutaway view, partially showing the machine and highlighting the aspiration cleaning set.

FIG. 39 shows the aspiration cleaning set (17) in detail, wherein it is assembled over the rear extension (119) of the chassis (1), which includes a first tube (171) having a lower end is a rectangular mouth (172) with a regulator (173) and is adjacently positioned to the selection screens (12), wherein the tube projects rearwardly and upwardly in a sloped fashion and which includes a crosswise beam (174) having an internal helix (175) in its intermediate portion which is operatively coupled to a hydraulic motor (176). In this way, means are provided to avoid clogging of the aspirated material, wherein the upper end of the tube (171) is also coupled to a circular box (178) by means of a transition (177), which has an unloading outlet (179) that is positioned in a rearward direction and which also houses an aspiration turbine (180). Aspiration turbine (180) has a vertical shaft (181) which is interconnected to the transmission (18) by means of a pulley (182) coupled to belts (183) and a respective belt tensioner (184). The rotation of the aspiration turbine (180) generates a strong flow of air passing through the selection screens (12) and, at that point (i. e. throughout the crosswise extension of the selection screens (12)), that flow of air causes the suction of materials lighter than nuts, particularly branches and leaves. All this material is guided through the tube (171), wherein the internal helix (175) avoids clogging of the material and enables it to flow to the unloading outlet (179) where the subsequently ejected material falls directly over the soil.

Figure 40:
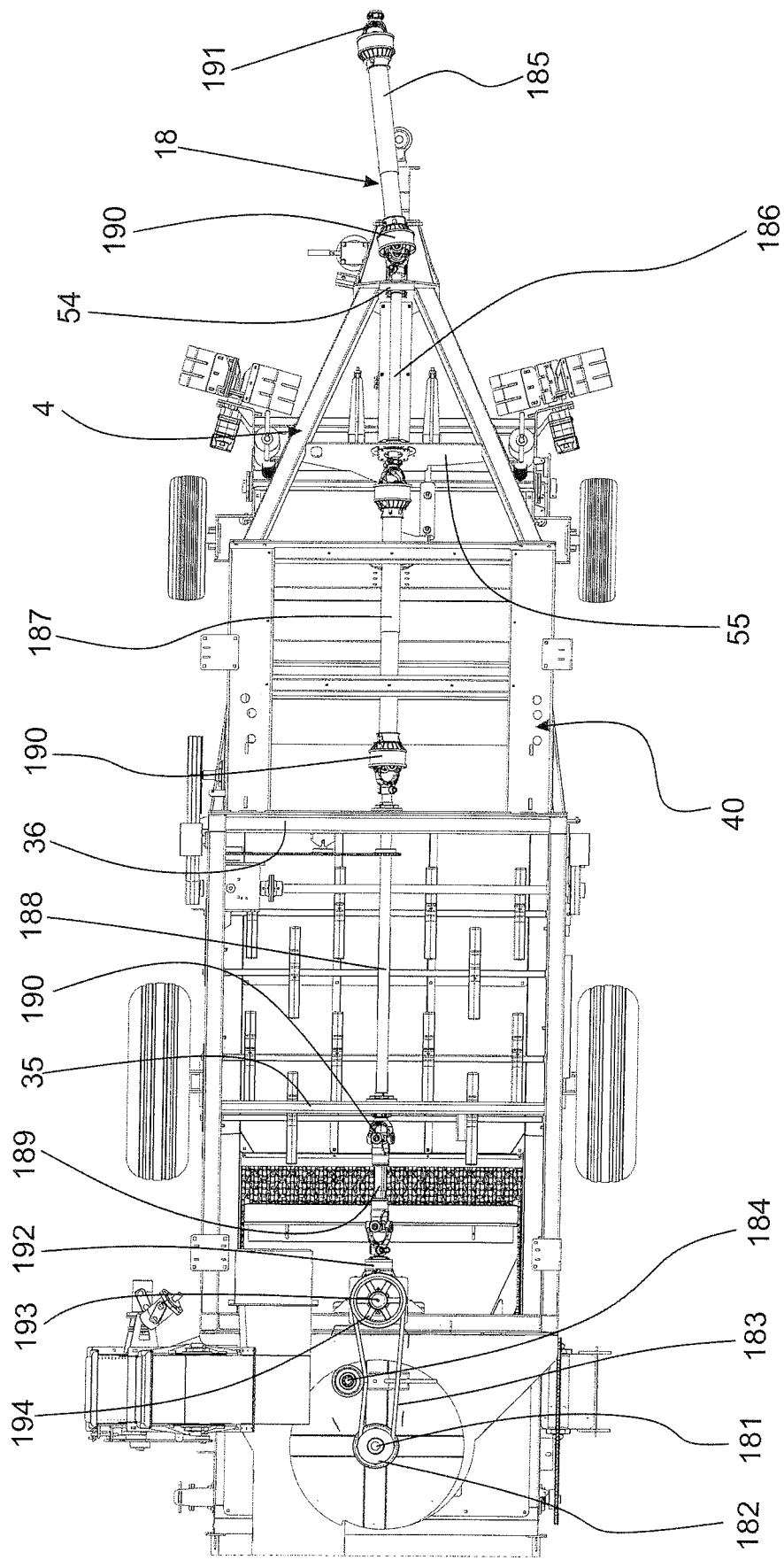
FIGS. 40 to 43 are various upper and other perspective views, including various enlarged details, showing details of an embodiment of the transmission set.
Figure 41:
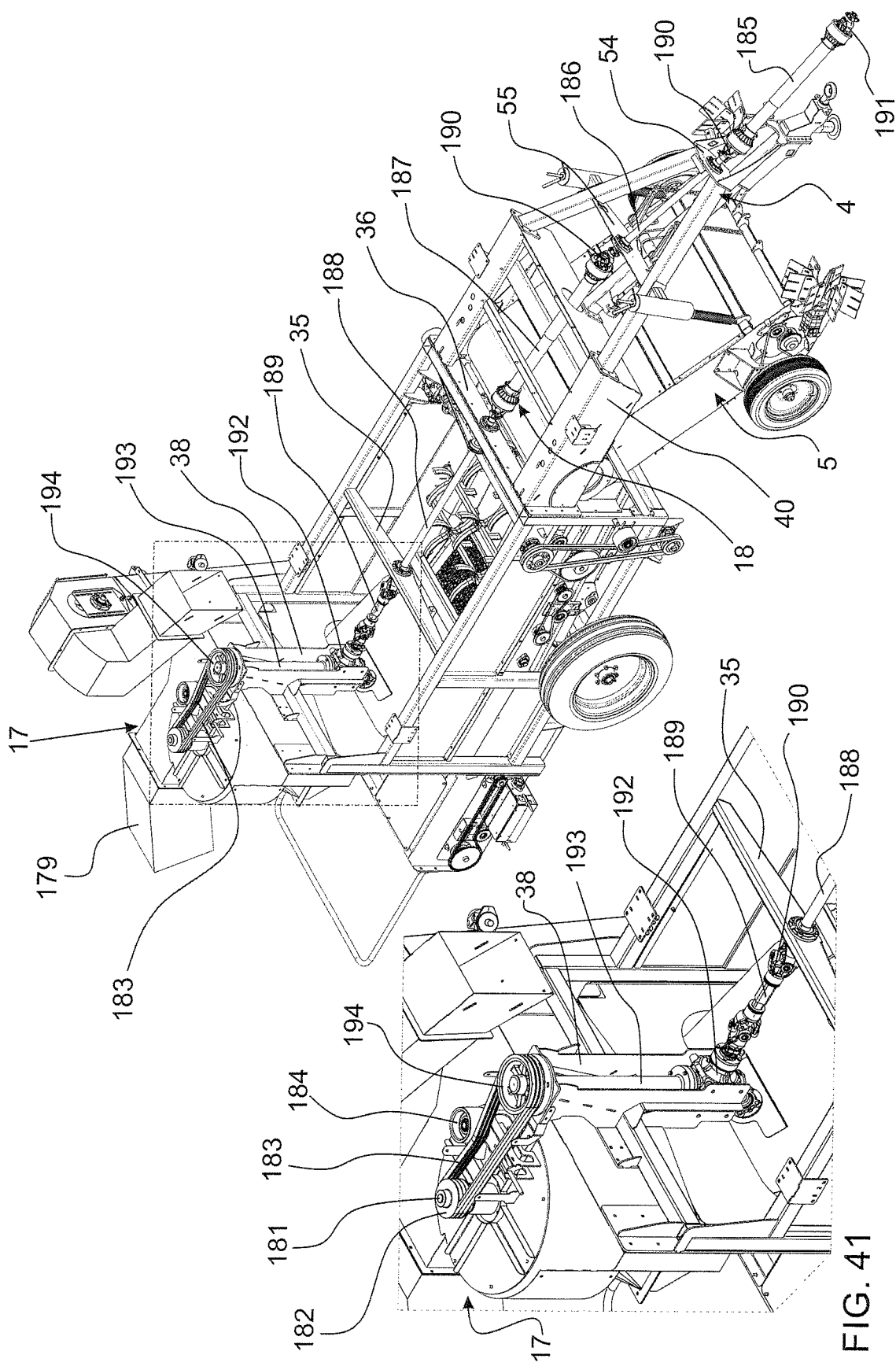

FIGS. 40 and 41 show the machine without its dump bucket, illustrating the transmission set (18) without some of its protection covers. It is contemplated that the transmission set extends lengthwise and can include various cardan shafts (185), (186), (187), (188) and (189), all of which are interconnected by universal joints (190) and wherein the free end of the primary cardan shaft (185) has means (191) for coupling to the power outlet of a usual tractor and its other end is coupled to the second cardan (186) having its ends rotatably supported by the plates (54) and (55) of the coupling drawbar (4) and also followed by the third cardan shaft (187) passing through the structural complement (40) and then subsequently connected to the fourth cardan (188) which has its ends rotatably supported over the aligned fittings of the crossbeams (35) and (36) and is subsequently connected to the last cardan (189) having an end that is coupled to the inlet shaft of a transmission case at 90° (192) and assembled inside the vertically prolonged support (38). It is contemplated that the outlet shaft cooperates with a prolongation (193) having its upper end provided with a pulley (194) to receive the belts (183) of the cleaning set (17).

Figure 42:
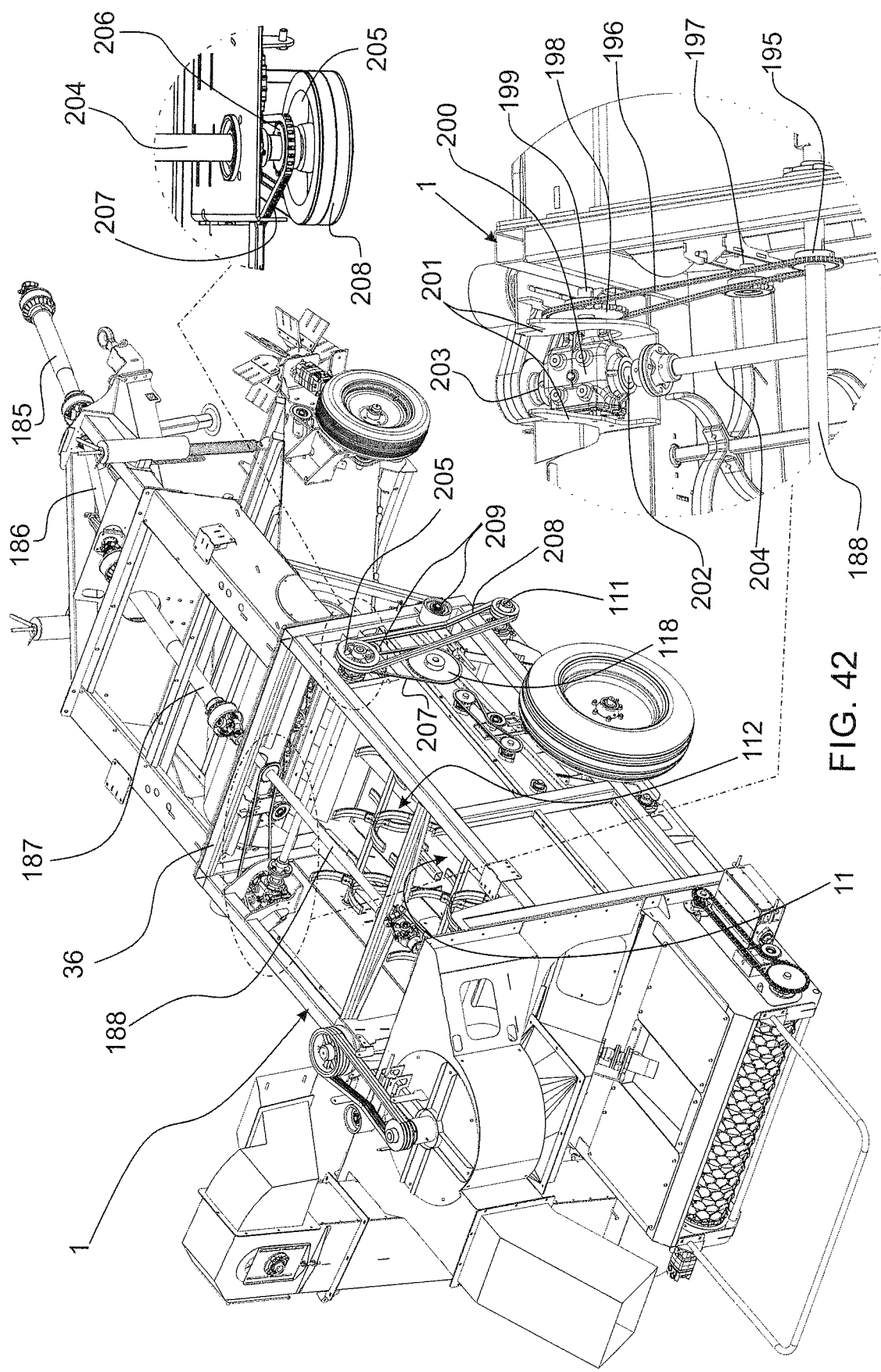

With reference to FIG. 42, it can be seen that at a position located rearward of the crossbeam (36), the fourth cardan shaft (188) includes gearing (195) and a respective cooperating chain (196) which, after passing through the chain tensioner (197), is also coupled to gearing (198) incorporated with the inlet shaft (199) of a transmission case (200) which is assembled to a support (201) existing on the left side of the chassis (1) and which has two axial outlet shafts (202) and (203) located in a crosswise manner and wherein the first outlet shaft (202) cooperates with a prolongation (204) located on the right side of the chassis (1), where it is rotatably supported and receives a pulley (205) and gearing (206) which, by means of a chain (207), belts (208) and chain tensioners (209), are respectively operably coupled to the gearing (118) of the pushing set (112) and the pulley (111) of the vibrator (105) of the vibrating screen assembly (11).

Figure 43:
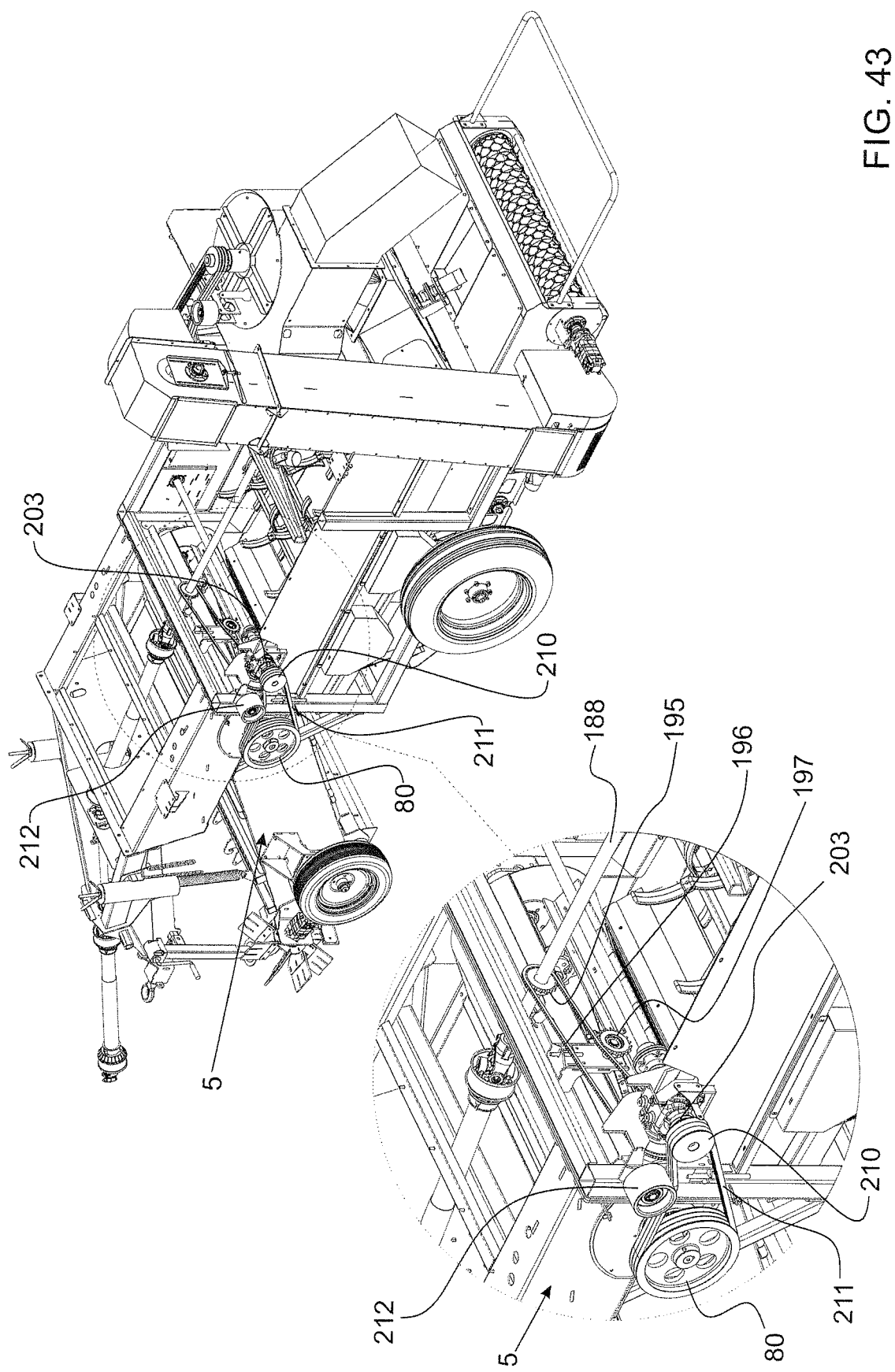

With reference to FIG. 43, the axial outlet shaft (203) is equally rotatably supported on the left side of the chassis (1), where it receives a pulley (210) and belts (211) with the respective belt tensioner (212) for operably coupling to the pulley (80) of the collecting set (5).

The invention claimed is:

1. A nut collector comprising:
    a chassis (1) having a lower surface supported over a crosswise shaft (2) and respective wheels (3) and a front surface having a coupling drawbar (4) for towing and coupling the chassis to a conventional tractor;
    a sloped collector set (5) assembled under the coupling drawbar (4), the collector set (5) having a rear edge hinged to an upper front part of the chassis (1), a front edge of the collector set (5) forming an inlet mouth (6) surrounded by rotating brushes (7) located adjacent to a ground and supported by side wheels (8) positioned adjacent the front edge of the collector set (5), such that aligned nuts in a region of the inlet mouth (6) are swept inside while the nut collector moves forward;
    a plurality of springs (9), one of the plurality of springs (9) positioned in a vertical manner on each side of the coupling drawbar (4), each of the plurality of springs (9) having a lower end coupled to the front edge of the collector set (5) in order to alleviate a weight of the collector set (5) during angular movement over irregular surfaces;
    a hydraulic lifter (10), having a first side fixed under the coupling drawbar (4) and a lower side adapted to be connected to the front edge of the collector set (5) such that the collector set (5) can be lifted to a raised position when the collector set (5) is not in operation;
    a vibrating screen assembly (11) located on the lower surface of the chassis (1), a front edge of the vibrating screen assembly (11) located adjacent and under an outlet of the collector set (5), the vibrating screen assembly (11) having a mesh size selected for inhibiting passage of the nuts, but facilitating passage of smaller residues and debris;
    a plurality of selection screens (12) located in continuity and in communication with a rear edge of the vibrating screen assembly (11), the selection screens (12) extending to a rear of the chassis (1) and including means for allowing the passage of the nuts and retaining larger residues and debris, the larger residues and debris being directly released over soil at the rear of the chassis (1);
    a crosswise transporter (14) assembled to a rear part of the nut collector and located inside the selection screens (12) such that clean nuts fall over the crosswise transporter (14);
    a nearly vertical, side mounted elevator (15) for vertically transporting the clean nuts, the elevator (15) having a lower end connected to and communicating with an edges of the crosswise transporter (14) in order to receive the clean nuts;
    a dump bucket (16) oriented crosswise to an upper surface of the chassis (1), an upper end of the elevator (15) flowing into and communicating with the dump bucket;
    an aspiration cleaning set (17) assembled crosswise over an initial part of the plurality of selection screens (142), the aspiration cleaning set adapted for collecting undesired material; and
    a transmission set (18) extending longitudinally along the coupling drawbar (4) and passing under the dump bucket (16) and terminating at the aspiration cleaning set (17), the transmission set (18) having a plurality of derivations distributed along a longitudinal axis for activating components of the nut collector.

2. The nut collector of claim 1 wherein the chassis (1) further comprises a tube and folded plate structure having a first central parallelepiped case having lower lengthwise rails (19) and upper lengthwise rails (20) interconnected by front vertical beams (21), intermediate vertical beams (22) and rear vertical beams (23), the rear vertical beams (23) being longer than the front vertical beams (21) and the intermediate vertical beams (22), each rear vertical beam having a lower plate end connected to side plate closures (24) stabilized with a rear crossbeam (25) and an intermediate crossbeam (26) thereby creating a support surface lower than the lower surface of the chassis (1) for mounting the crosswise transporter (14), the lower surface of the chassis (1) having a front crossbeam (27) having a lower intermediate support (28) and interconnecting the lower lengthwise rails (19) having lower surfaces with lower intermediate supports (29) and side angle supports (30, 31), the intermediate supports (29) providing points of support for the crosswise shaft (2) of the wheels (3), the lower intermediate support (28) and the side angle supports (30, 31) together with the intermediate crossbeam (26) providing fixation points for the vibrating screen assembly (11); the front vertical beams (21), the intermediate vertical beams (22) and the rear vertical beams (23) interconnected from an inside by lengthwise plate parts (32) having lower flaps (33) inwardly angled and providing a fixation point for the vibrating screen assembly (11);
    wherein the upper surface of the chassis (1) is structurally interconnected by an upper rear crossbeam (34), an intermediate crossbeam (35) and a front crossbeam (36), the intermediate crossbeam (35) and the front crossbeam (36) having aligned fittings (37) and a vertically prolonged support (38) mounted on an intermediate portion of the upper rear crossbeam (34) such that the upper rear crossbeam (34), the intermediate crossbeam (35) and the front crossbeam (36) support means for assembling the activation set (18); and,
    wherein supports (39) are provided on the rear corners of the chassis (1) to support the aspiration cleaning set (17).

3. The nut collector of claim 2 wherein the chassis (1) further comprises a structural complement (40) mounted to a front of the chassis (1), the structural complement (40) extending a whole width of the chassis (1) and an upper half of a height of the chassis,
    wherein the structural complement (40) has internal crossbeams (41), a sloped front (42) plate closure and vertical side (43) plate closures; and wherein the sloped front (42) plate closures is adapted to receive the activation set (18) and the vertical side (43) plate closures have hinged supports (44) for the sloped collector set (5); and wherein the structural complement (40) has upper supports (45) provided on the upper lengthwise rails (20), the upper supports (45) constituting support points for the dump bucket (16).

4. The nut collector of claim 1 wherein the coupling drawbar (4) is formed by three rectangular tubes (46), each tube (46) having a rear end with shoes (47) fixed to a front of a structural complement (40), the rear ends of the tubes (46) converging and integrating into a plate case (48) thereby forming a pyramidal structure having a triangular base, the plate case (48) having a lower complement (49) with a support (50) for a conventional jack (51), the plate case projecting frontwards (52) and receiving a coupling (53), the plate case (48) having an upper surface that is open and having a first crosswise plate (54) and a second crosswise plate (55), the first crosswise plate (54) and the second crosswise plate (55) forming intermediate assembly supports for the activation set (18).

5. The nut collector of claim 1, wherein the sloped collector set (5) further comprises a tunnel-shaped body having a crosswise rectangular section positioned on a slope, the tunnel-shaped body being defined by side plates (56) and structurally interconnected by upper crossbeams (57), (58) and (59), lower crossbeams (60) and having upper plate closures (61) extending between the upper crossbeams (57), (58) and (59), the lower crossbeams (60), the upper plate closures (61) located on a lower surface of the tunnel-shaped body being a plate screen (62), with upper edges of the side plates (56) being rounded and interconnected by equally rounded closures (63) and having an outlet (64) with a lower crosswise trim (65) to permit harvested material passage up to the vibrating screen assembly (11); the side plates (56) having opposed and lower edges that include angle squeegees (66) adapted for guiding material to be collected into the inlet mouth (6) of the sloped collector set (5), the sloped collector set further including a crosswise sweeping roller formed by a shaft (68) and having radial rubber fins (69), with ends of the shaft (68) mounted and rotatably supported on the side plates (56), a first end of the shaft receiving a gearing (70) that is mechanically and rotationally synchronized with an additional gearing (73) provided on a second shaft (74) by means of a chain (71) and stretchers (72), ends of the second shaft (74) mounted and rotatably supported on the front edges of the side plate (56), the second shaft (74) including a number of intermediate gearings (75) having cooperating chains (76) that are mechanically and rotationally interconnected with a plurality of crosswise rubber scrapers (77), the plurality of crosswise rubber scrapers coupled to additional gearings (78) connected to a third shaft (79), the third shaft being mounted and rotatably supported on the upper edges of the side plates (56), the third shaft (79) further receiving a traction pulley (80) that cooperates with a scraping belt (81) that is adapted for pulling the aligned nuts through the inlet mouth (6) and guiding the aligned nuts to an outlet (64); and wherein pre-cleaning is performed by the plate screen (62), an upper edge of the sloped collector set (5) is hinged to the chassis (1) by way of the third shaft (79) having ends on supports (44) of a structural complement (40) of the chassis (1); and wherein supports (82) for the side wheels (8) are located on external faces of the lower edges of the side plates (56) thereby keeping a lower edge of the sloped collector set (5) leveled over the soil and keeping a sweeping roller (67) and the rotating brushes (7) equally leveled over the soil.

6. The nut collector of claim 5, wherein each rotating brush (7) further comprises an L-shaped support (83) having a respective hydraulic motor (84), the hydraulic motor (84) having a forwardly projecting shaft that receives a rubber brush (85); and wherein each rotating brush (7) is sloped at an inwardly oriented angle to enable each rotating brush (7) to sweep the nuts towards an inner side of the inlet mouth (6).

7. The nut collector of claim 4 wherein each of the plurality of springs (9) is a vertical tube (86) fixed to a respective rectangular tube (46) of the coupling drawbar (4) by means of a support (87), the vertical tube (86) having a manual regulation spindle (88) cooperating with a spring (89) that is equally housed inside the vertical tube (86), the vertical tube (86) having a lower end coupled to a hook (90) welded to an upper crossbeam (58) of the sloped collector set (5) thereby allowing the weight of the sloped collector set (5) to be alleviated by the plurality of springs (9).

8. The nut collector of claim 1 wherein the hydraulic lifter (10) has a support (91) fixed between a lower rectangular tube (46) and a crosswise plate (55) of the coupling drawbar, the support (91) mounted and rotatably supporting a crosswise shaft (92), the crosswise shaft (92) supporting vertexes of a plurality of L-shaped parts (93), each L-shaped part having a downwardly projecting first leg coupled to a hydraulic cylinder (94), and a second leg adapted to receive an upper end of a chain (95), the chain (95) having a lower end coupled to a hook (96) provided on crossbeams (57) of the sloped collector set (5) such that when the hydraulic cylinder (94) is activated the sloped collector set (5) is raised or lowered.

9. The nut collector of claim 1, further comprising an additional vertical chain (97) having an upper end fixed to a respective tube (46) of the coupling drawbar (4), the additional vertical chain (97) having a lower end coupled to an additional hook (98) provided on a crossbeam (57) of the sloped collector set (5) thereby permitting the sloped collector set (5) to be locked in a hinged position.

10. The nut collector of claim 1, wherein the vibrating screen assembly (11) has a bottom surface that is a screen (99) divided lengthwise by parallel walls (100), the parallel walls (100) having three sides covered by side walls (101a) and a front wall (101b), the front wall (101b) positioned in front of an outlet (64) of the sloped collector set (5), the side walls (101a) being located behind flaps (33) of plates (32) of the chassis (1), a rear side of the screen (99) having a drainage flap (102) and located over an initial section of the plurality of selection screens (12); the side walls (101a) having external supports (103) adapted for fixing upper ends of sloped blade springs (104), the sloped blade springs (104) having lower edges fixed to side angle supports (30), (31) and an intermediate crossbeam (26) of the chassis (1) such that the vibrating screen (11) vibrates upon activation of a vibrator (105) assembled to a lower side of the screen (99) in connection with side supports having bearings (106), the bearings (106) providing hinged support for edges of a crosswise shaft (107) that is radially interconnected to a triangular arm (108), the triangular arm (108) having a vertex that is secured to an eccentric vibrator (109) assembled to a lower intermediate support (28) of the chassis (1), the eccentric vibrator (109) being coupled to an edge of an axle (110) having an opposed end is that is mounted to and rotatably supported on the side angle support (31) of the chassis (1), the axle (110) receiving a pulley (111) that is operably coupled with the transmission set (18).

11. The nut collector of claim 1 further comprising a pushing set (112) having crosswise shafts (113) having distributing helices (114) that turn immediately above the vibrating screen assembly (11) to push screened material towards the plurality of selection screens (12), the crosswise shafts (113) having ends mounted to and rotatably supported on plate parts (32), each of the crosswise shafts receiving gearings (115) which are synchronized by chains (116) and corresponding chain stretchers (117), wherein at least one of the shafts (1143) has a pulley (118) at a first end, the pulley operably connected with the transmission set (18), allowing material received over the screen assembly (11) to be moved rearwardly and to pass through an additional cleaning step wherein particles smaller than the nuts are removed, and leaves and branches continue to move behind towards the plurality of selection screens (12) where the nuts are separated from the leaves and the branches.

12. The nut collector of claim 1 wherein the plurality of selection screens (12) is assembled inside a rear extension (119), the rear extension (119) continuously abutting a lower plan of the chassis (1), the rear extension (119) having an outlet (120) for the undesired materials larger than the nuts, the outlet (120) covered by a "U"-shaped tubular protector (121), the rear extension (119) having a width that is approximately equal to a width of the chassis (1), the rear extension (119) having a reduced height that is approximately equal to ⅓ of a height of the chassis (1); and wherein the rear extension (119) provides a complementary assembly structure for the plurality of selection screens (12), the crosswise transporter (14) and the elevator (15) adapted for transporting cleaned nuts.

13. The nut collector of claim 1 wherein the plurality of selection screens (12) has two crosswise rollers, a front roller (122) located under the vibrating screen assembly (11), an intermediate roller (123) and a rear roller (124) located at an outlet (120) of a rear extension (119), the intermediate roller (123) and the rear roller (124) being mounted and rotatably supported on the sides of the rear extension (119), the front roller (122) turning freely and having ends mounted and rotatably supported on side plate closures (24) of the chassis (1); and wherein the rear roller (124) has a first end coupled to a hydraulic motor (125), a second end of the rear roller (124) being synchronized mechanically coupled with the intermediate roller (123) by way of cooperating gearings (126), a chain (127) and a corresponding chain stretcher (128); and wherein a first belt-like screen (129) is suspended over the front roller (122) and the intermediate (123) rollers, the first belt-like screen (129) having a mesh size smaller than the size of a nut, the first belt-like screen (129) having a front edge located under and adjacent to a drainage flap (102) of the vibrating screen (11), with rear edge ends of the first belt-like screen (129) positioned above the crosswise transporter (14); and wherein a second belt-like screen (130) is suspended over the front roller (122) and the rear roller (124) in a position adjacent to the first belt-like screen (129), the second belt-like screen (130) having a larger mesh size than a nut, the second belt-like screen (130) starting under the drainage flap (102) of the vibrating screen assembly (11) and ending at the outlet (120) of the rear extension (119).

14. The nut collector of claim 1, the crosswise transporter (14) having a crosswise gutter (131) having ends that are fixed to a rear extension (119), one of the ends of the crosswise transporter (14) terminating adjacent and inside the lower edge of the elevator (15); the crosswise gutter (131) having upper edges sloped and outwardly oriented in the form of a first flap (132) and a second flap (133), the first flaps (132) being located under a roller (123) and the second flaps (133) being located close to the roller (124) of the plurality of selection screens (12) such that the nuts are guided to a position inside the crosswise gutter (131), the crosswise gutter (131) having a belt (134) in an inner part, the belt (134) suspended over a right roller (135a) and a left roller (135b), the left roller (135b) having an end with a gearing (135c) adapted to receive rotational motor power from the elevator (15), allowing the nuts falling over the crosswise transporter (14) to be guided into the elevator (145) and from the elevator (15) into the dump bucket (16).

15. The nut collector of claim 1, wherein the elevator (15) for clean nuts has an almost vertical tube (136) that is slightly sloped inwardly, the elevator (15) having a lower end that is rounded and has a screen-like closure (137), the elevator (15) being in communication with an end of the crosswise transporter (14), the upper end of the elevator (15) extending inwardly and forwardly, thereby forming a sloping outlet tube (138) that flows into the dump bucket (16); the almost vertical tube (136) having at least one sliding inspection door (139), the almost vertical tube (136) having an upper shaft (140) and respective bearings (141) fixed to supports having sliding regulators (142) that are assembled to walls of the almost vertical tube (136), the almost vertical tube (136) having a lower shaft (143) having a first end rotatably coupled to a hydraulic motor (144) and a second end having a gearing (145) that is operably interconnected to a gearing (135c) of a shaft (135b) of the crosswise transporter (14) by way of a chain (146) and chain stretchers (147), each of the upper shaft (140) and the lower shaft (143) having a gearing (148) that is operably connected to chains (149) which are adapted for interconnection with a plurality of conveyor shells (150), each of the plurality of the conveyor shells (150) having a bent over position while in operation and positioned inwardly, and having an upwardly oriented loaded position when positioned outwardly; and wherein when each of the plurality of conveyor shells (150) passes the lower end that is rounded and the screen-like closure (137), each of the plurality of conveyor shells is loaded with clean nuts provided from the crosswise transporter (14) and subsequently moved upwards and, when the upper end of the elevator (15) is reached, each of the plurality of the conveyor shells (150) moves from the upwardly oriented loaded position to the bent over position thereby dumping the nuts into the sloping outlet tube (138) and the dump bucket (16).

16. The nut collector of claim 1, wherein the dump bucket (16) is positioned upwardly adjacent from the chassis (1) and includes a rack-shaped structure (151) having four feet (152) interconnected in pairs by crossbeams (153), the feet (152) all sloped to a right side of the nut collector and having lower ends with shoes (154) and (155) fixed over supports (45) provided on the upper surface of the chassis (1), the feet (152) having upper ends that are unified with laterally corresponding feet (152) thereby forming two hinging points (156), an interconnection beam provided between the hingedly connected pairs of feet (152), the hinging points (156) being outwardly oriented and extending laterally beyond limits of a right side of the chassis, the dump bucket

(16) located adjacent to the rack-shaped structure (151) in the form of a case, the dump bucket (16) having a respective screen-like side (158) that extends upwardly higher than adjacent sides of the dump bucket (157), the screen-like side (158) being sloped and having upper corners provided with fitting pins (159) at the hinging points (156) of the rack-shaped structure (151), an upper edge of the dump bucket (157) having a tilting drainage ramp (160), an opening of the tilting drainage ramp (160) limited by chains (161) interconnecting a free edge of the drainage ramp (160) to an upper crossbeam (162) such that the drainage ramp (160) opens until the drainage ramp (160) is coplanar with the screen-like side (158) and closes until the free edge of the drainage ramp (160) remains over the upper crossbeam (162), the dump bucket (16) having a hydraulic cylinder (163) provided on each side of the dump bucket (16), a lower edge of the dump bucket being hinged to a complementary support (164) that is integrated with the shoes (154) of the feet (152), upper edges of the dump bucket (157) being hingedly connected to pins (165) provided on ends of the upper crossbeam (162), pins (165) serving as a rotational support point for a first end of a diagonally positioned spreading screw (166), a second end of the diagonally positioned spreading screw (166) mounted and rotationally supported on a support (167), the diagonally positioned spreading screw (166) coupled to a hydraulic motor (168), such that the rotational activation of diagonally positioned spreading screw (166) levels the nuts inside the dump bucket; the dump bucket (16) having an alignment dome (169) on a side facing the elevator (15), the dome providing a centralized opening (170) that aligns with a sloping outlet tube (138), such that when the dump bucket (16) is tilted back to an initial loading position following unloading, the dump bucket returns to the initial loading position and the dome is aligned with the sloped outlet tube (138).

17. The nut collector of claim 1, wherein the aspiration cleaning set (17) extends above a rear extension (119) of the chassis (1), the aspiration cleaning set (17) comprising a tube (171) having a lower ends that is a rectangular mouth (172) with a regulator (173), the rectangular mouth (172) and the regulator (173) positioned close to the plurality of selection screens (12); and wherein the tube (171) projects upwardly and rearwardly in a sloped manner and includes an intermediate crosswise shaft (174) having an internal helix (175), the intermediate crosswise shaft (174) externally coupled to a hydraulic motor (176) and thereby providing means for avoiding clogging of aspirated material; and wherein an upper edge of the tube (171) is coupled to a circular case (178) by means of a transition (177), the circular case (178) having a rearwardly facing unloading outlet (179) and housing an aspiration turbine (180), the aspiration turbine (180) having a vertical shaft (181) that is interconnected to the transmission (18) by means of a pulley (182) rotationally coupled to belts (183) and a respective cooperating belt stretcher (184).

18. The nut collector of claim 1, wherein the transmission set (18) further comprising a plurality of cardan shafts (185), (186), (187), (188) and (189), the plurality of cardan shafts interconnected to one another by universal joints (190), a primary cardan shaft (185) having a first end provided with means (191) for coupling to a power outlet of a conventional tractor and a second end coupled to a second cardan shaft (186) having ends mounted and rotatably supported on plates (54) and (55) provided on the coupling drawbar (4), the second cardan shaft (186) rotatably coupled to a third cardan shaft (187) that extends across a structural complement (40) and is rotatably coupled to a fourth cardan shaft (188), the fourth cardan shaft (188) having ends mounted and rotatably supported on aligned fittings provided on crossbeams (35) and (36), the fourth cardan shaft (188) being rotatably coupled to a first end of a fifth cardan shaft (189), the fifth cardan shaft (189) having a second end coupled to an inlet shaft of a 90° transmission box (192), the 90° transmission box (192) assembled inside a vertically elongated support (38); and wherein an outlet shaft of the 90° transmission box (192) receives a prolongation (193) having an upper end provided with a pulley (194) adapted to receive belts (183) from the aspiration cleaning set (17), the fourth cardan shaft (188) receiving a gearing (195) at a position adjacent the crossbeam (36), the gearing (195) operably connected to a chain (196) which passes through a chain stretcher (197) and is coupled to a gearing (198) connected to an inlet shaft (199) of a transmission box (200), the transmission box (200) being assembled to a support (201) provided on a left side of the chassis (1), the transmission box (200) having a first axial outlet shaft (202) and a second axial outlet shaft (203) positioned in a crosswise manner, the first axial outlet shaft (202) having a prolongation (204) that extends and is rotatably supported at a position adjacent to a right side of the chassis (1), the first axial outlet shaft having a pulley (205) and a gearing (206) which, by means of a chain (207), belts (208) and cooperating stretchers (209), are respectively coupled to a gearing (118) of a pushing set (112) and a pulley (111) of a vibrator (105) of the vibrating screen assembly (11); the second axial outlet shaft (203) extending and rotatably supported at a position adjacent to the left side of the chassis (1), the second axial outlet shaft (203) having a pulley (210) and belts (211) with cooperating stretchers (212) for coupling to a pulley (80) of the sloped collector set (5).

\* \* \* \* \*